(12) United States Patent
Keaveny et al.

(10) Patent No.: US 6,292,873 B1
(45) Date of Patent: Sep. 18, 2001

(54) DUAL-PORTED ELECTRONIC RANDOM ACCESS MEMORY THAT DOES NOT INTRODUCE ADDITIONAL WAIT STATES AND THAT DOES NOT CAUSE RETRANSMISSION OF DATA DURING SHARED ACCESS

(75) Inventors: Thomas A. Keaveny, Auburn; Donald M. Cross, Newcastle, both of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/083,957

(22) Filed: May 22, 1998

(51) Int. Cl.[7] .................................................... G06F 13/00
(52) U.S. Cl. ............................................. 711/149; 711/154
(58) Field of Search ...................................... 711/149, 154

(56) References Cited

U.S. PATENT DOCUMENTS 4,320,450 * 3/1982 Rose et al. ............................ 711/149
4,783,731 * 11/1988 Miyazaki et al. ................ 711/149 X

OTHER PUBLICATIONS

Barsness et al., Storage Interface with Buffer, IBM Technical Disclosure Bulletin, vol. 27, No. 4A, Sep. 1984, pp. 2140–2148.*

* cited by examiner

Primary Examiner—David L. Robertson

(57) ABSTRACT

A high-performance dual-ported shared memory that interconnects two 32-bit PCI buses with a RAM memory that provides an address space of 64-bit words. The high-performance dual-ported shared memory provides two independent channels for reading from, and writing to, the RAM memory. By interleaving 64-bit read and write operations directed to the RAM memory with 32-bit PCI bus data transfer operations, and by internally buffering data, the high-performance dual-ported shared memory can independently provide data access at PCI data transfer rates to both PCI buses without introducing wait states.

21 Claims, 24 Drawing Sheets

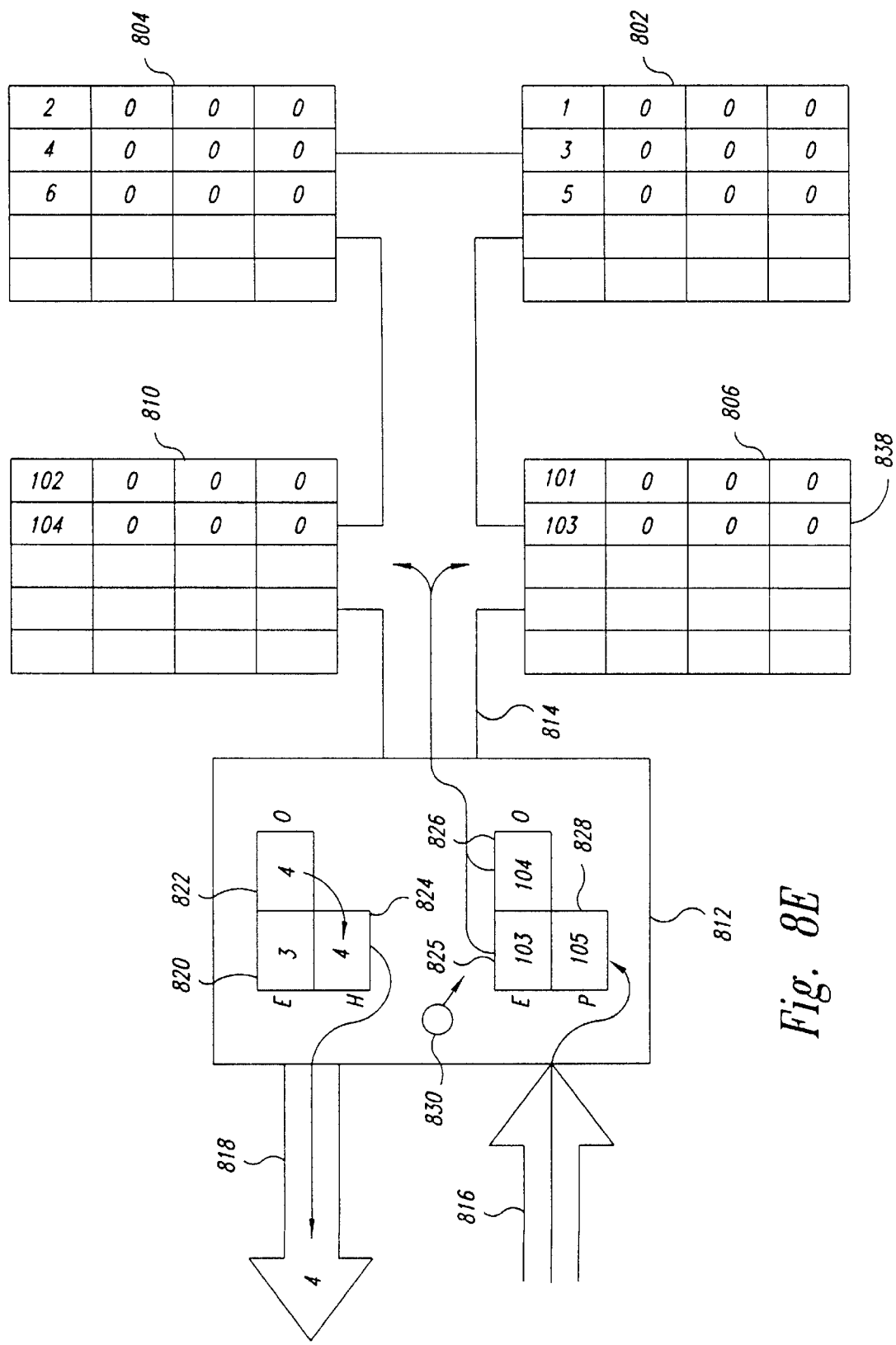

DUAL-PORTED ELECTRONIC RANDOM ACCESS MEMORY THAT DOES NOT INTRODUCE ADDITIONAL WAIT STATES AND THAT DOES NOT CAUSE RETRANSMISSION OF DATA DURING SHARED ACCESS

TECHNICAL FIELD

The present invention relates to computer random access memories and, in particular, to a dual-ported shared random access memory supporting fully independent and concurrent access from both ports without wait states.

BACKGROUND OF THE INVENTION

Dual-ported shared memory is, for efficiency reasons, an essential component in many multi-bus computer system architectures. For example, FIG. 1 is an architecture block diagram of a high-performance Fibre Channel/SCSI-bus multiplexer that exchanges data transfer commands and data between Fibre Channel networks and SCSI buses. The high-performance Fibre Channel/SCSI-bus multiplexer includes Fibre Channel host adapters 102 and 104, SCSI-bus adapters 106–109, and an internal processor 110 that all access a dual-ported shared memory 112 via an upper Peripheral Component Interconnect ("PCI") bus 114 and lower PCI bus 116. Data is exchanged between Fibre Channel host adapters 102 and 104 and the SCSI-bus adapters 106–109 through buffers allocated from within the dual-ported shared memory 112. Because a high-performance Fibre Channel/SCSI-bus adapter must concurrently, in both directions, transfer data at very high data transfer rates, it is vital that the dual-ported shared memory provide essentially independent channels for both reading and writing the contents of the dual-ported shared memory, and the reading and writing transfers need to transfer data at the data transfer rate provided by the upper PCI bus 114 and lower PCI bus 116 connected to the two ports.

For example, FIG. 2 illustrates a snapshot in time of simultaneous memory accesses of the dual-ported shared memory within the high-performance Fibre Channel/SCSI-bus multiplexer. In FIG. 2, the contents of a memory buffer 202 within the dual-ported shared memory 204 is being read from the first port 206 at the same time that a different memory buffer 208 is being written from the second port 210. This circumstance often arises during a double-buffered transfer of data from a mass storage device controlled by a SCSI adapter to a remote computer system reading data from the mass storage device via a Fibre Channel connection.

Currently-available dual-ported shared memory designs do not support maximally efficient data transfers to two independent ports. FIG. 3 illustrates common deficiencies in currently-available dual-ported shared memory designs. In FIG. 3, a clock signal 302 for a clock driving two computer buses is shown superimposed with the data being transferred on the first computer bus 304 and the data being transferred on the second computer bus 306. For maximal efficiency of data transfer, the dual-ported shared memory should be able to provide the contents of successive memory locations, in the case of a read operation, or receive values to be placed in successive memory locations, in the case of write operations, during each clock cycle. However, in currently-available dual-ported shared memories, the dual-ported shared memory frequently introduces wait states, which are essentially empty or lost clock cycles during which data is not transferred. For example, in the data contents for the first computer bus 304, the dual-ported shared memory was not able to provide or accept data values during clock cycles 308 and 310. Another commonly-occurring problem in currently-available dual-ported shared memories is overhead associated with restarting a data transfer from or to the dual-ported shared memory after the computer bus introduces wait states during the data transfer. For example, in the data transfer for the second computer bus 306, the computer bus stops sending data, for two clock cycles, at clock cycles 312 and 314. At clock cycle 316, the computer bus asserts a signal line on the computer bus to indicate the ability to again receive data from the dual-ported shared memory. However, the dual-ported shared memory then incurs a latency period during clock cycles 316 and 318 and, when the dual-ported shared memory finally begins to resume data transfer, at clock cycle 320, the dual-ported shared memory begins retransmitting data that was previously transferred in the clock cycles 322–325 that immediately preceded the wait cycles 312 and 314 introduced by the second computer bus.

Thus, a need has been recognized in the computer industry for a dual-ported shared memory that can provide a continuous flow of data to two different computer buses. It is desirable that such a dual-ported shared memory be able to support both read and write operations simultaneously to both computer buses without introducing wait states and without retransmitting data following a wait state introduced by either of the computer buses.

SUMMARY OF THE INVENTION

The present invention provides a high-performance, efficient dual-ported shared memory that independently provides both reading and writing data transfer operations to two different computer buses. The dual-ported shared memories implemented with 4 2-megabyte static random access memories are connected to a data multiplexer and an address multiplexer via a 64-byte bus. The data multiplexer and address multiplexer interface with two different 32-bit PCI buses. During each clock cycle, the data multiplexer can transfer a 32-bit word to, or receive a 32-bit word from, each PCI bus. During each clock cycle, the data multiplexer can transfer a 64-bit word to, or receive a 64-bit word from, the static random access memories. Thus, during each clock cycle, the data multiplexer can move 2 32-bit words between the PCI buses and the static random access memories.

The static random access memories are laid out into even and odd aligned word columns. During each clock cycle, the data multiplexer can transfer a 32-bit word to or from a memory location within the even data column, and a 32-bit word to or from a successive memory location within the odd data column. The data multiplexer alternates 64-bit transfers for each PCI bus at successive clock cycles. Thus, the data multiplexer can transfer 64-bits of data between a particular PCI bus and the static random access memories at every other clock cycle. By internally buffering data received either from the PCI bus during a write operation, or the static random access memory during a read operation, the data multiplexer can receive a 32-bit word from, or transfer a 32-bit word to, each PCI bus during each clock cycle. By internally buffering 96-bits of data for each data transfer direction between the data multiplexer and each PCI bus, the dual-ported shared memory has sufficient internal storage capacity to immediately resume data transfer following a wait state imposed by a PCI bus.

BRIEF DESCRIPTION OF THE DRAWINGS

FIGS. 8A–8E, 9A–9E, and 10A–10F illustrate the operation of the HPSM during simultaneous writing and reading operations to and from the SRAMs.

DETAILED DESCRIPTION OF THE INVENTION

In one embodiment of the present invention, the high-performance dual-ported shared memory with no wait states includes 4 2-Megabyte ("MByte") static random access memories ("SRAMs") connected to a data multiplexer and an address multiplexer via a 64-bit bus. The data multiplexer and the address multiplexer are, in turn, connected to 2 32-bit PCI buses. The high-performance dual-ported shared memory ("HPSM"), during each clock cycle, can transfer 2 32-bit words to, or receive 2 32-bit words from, the SRAMs and can concurrently transfer a 32-bit word to, or receive a 32-bit word bit from, both PCI buses, once initial access latencies have been satisfied. Data transfer between the data multiplexer and the PCI buses, during each clock cycle, is interleaved with data transfer related to a particular PCI bus between the data multiplexer and the SRAMs on alternate clock cycles, via internal data buffering within the data multiplexer. The internal data buffering within the data multiplexer is of sufficient capacity to allow for immediate resumption of data transfer following wait states imposed by the PCI buses.

Figure 1:
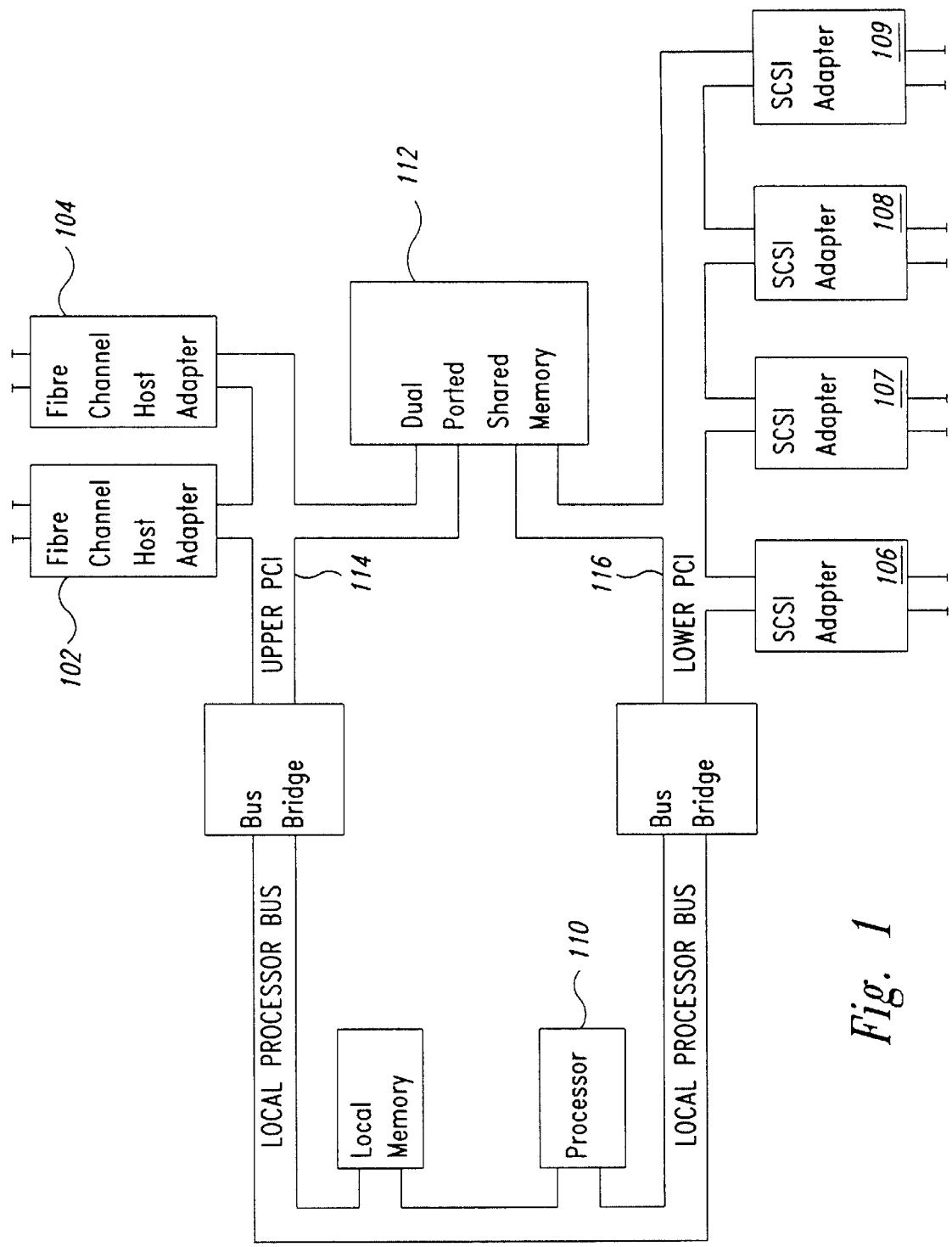
FIG. 1 is an architecture block diagram of a high-performance Fibre Channel/SCSI-bus multiplexer that exchanges data transfer commands and data between Fibre Channel networks and SCSI buses.
Figure 2:
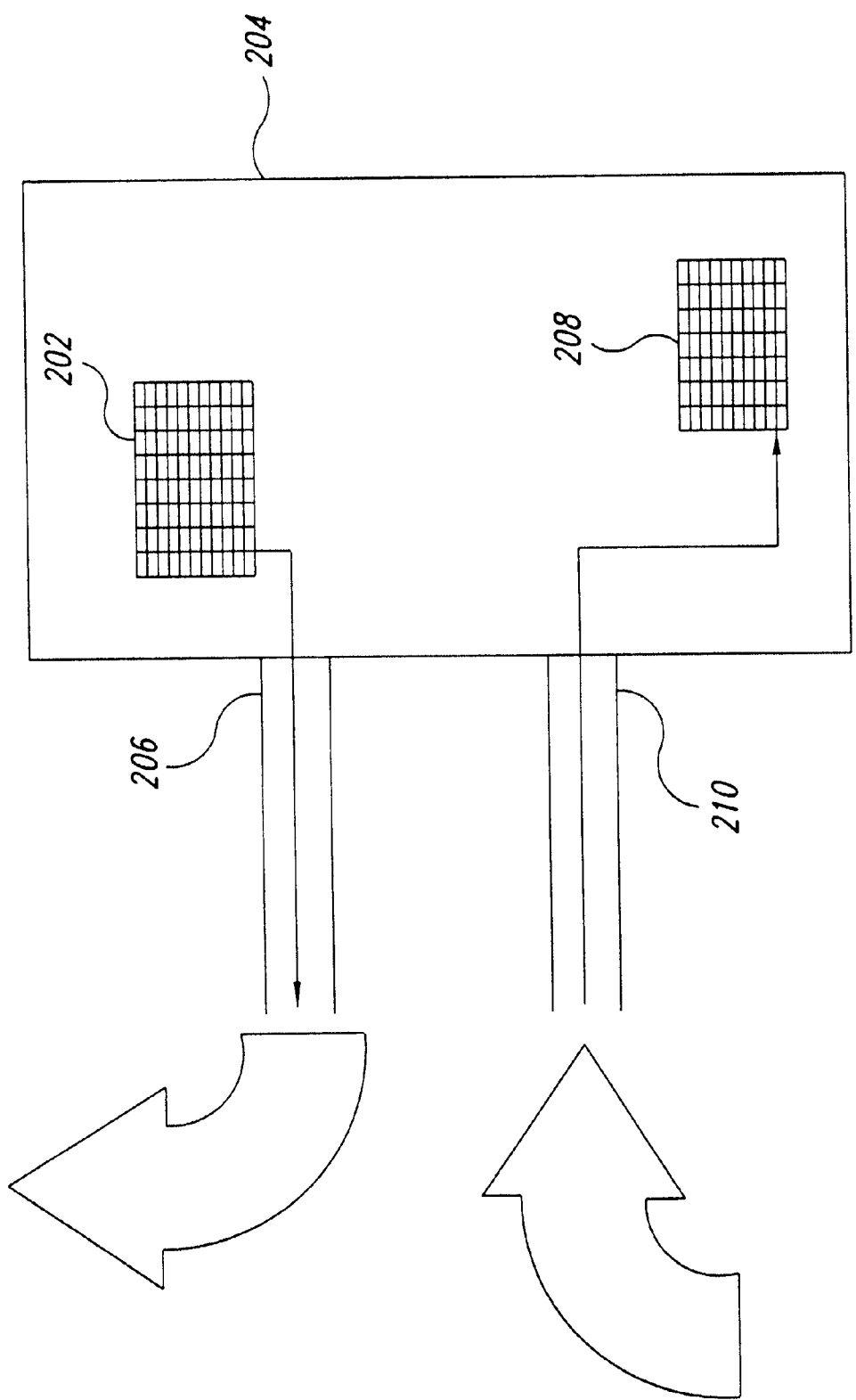
FIG. 2 illustrates a snapshot in time of simultaneous memory accesses of the dual-ported shared memory within the high-performance Fibre Channel/SCSI-bus multiplexer.
Figure 3:
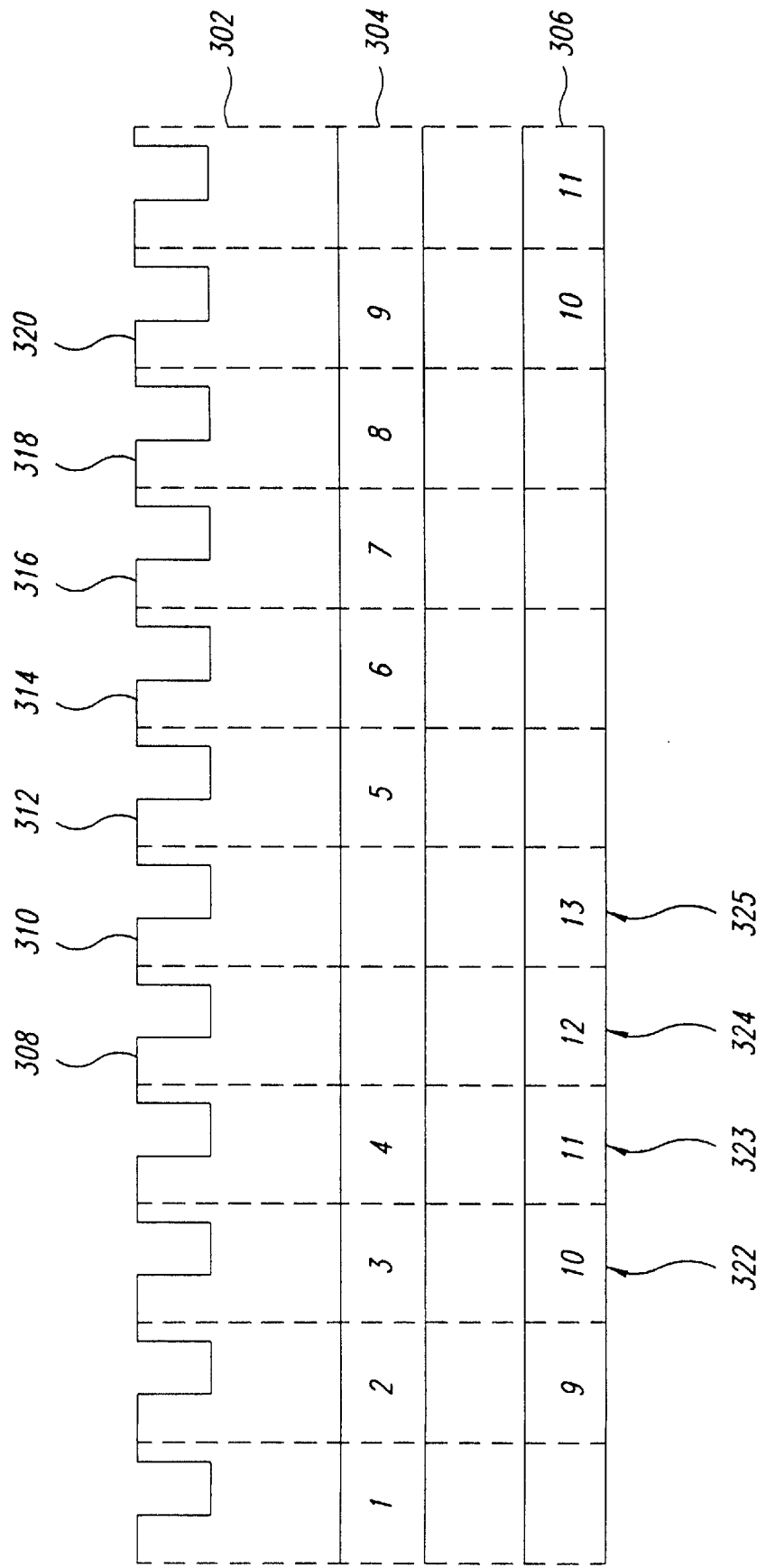
FIG. 3 illustrates common deficiencies in currently-available dual-ported shared memory designs.
Figure 4:
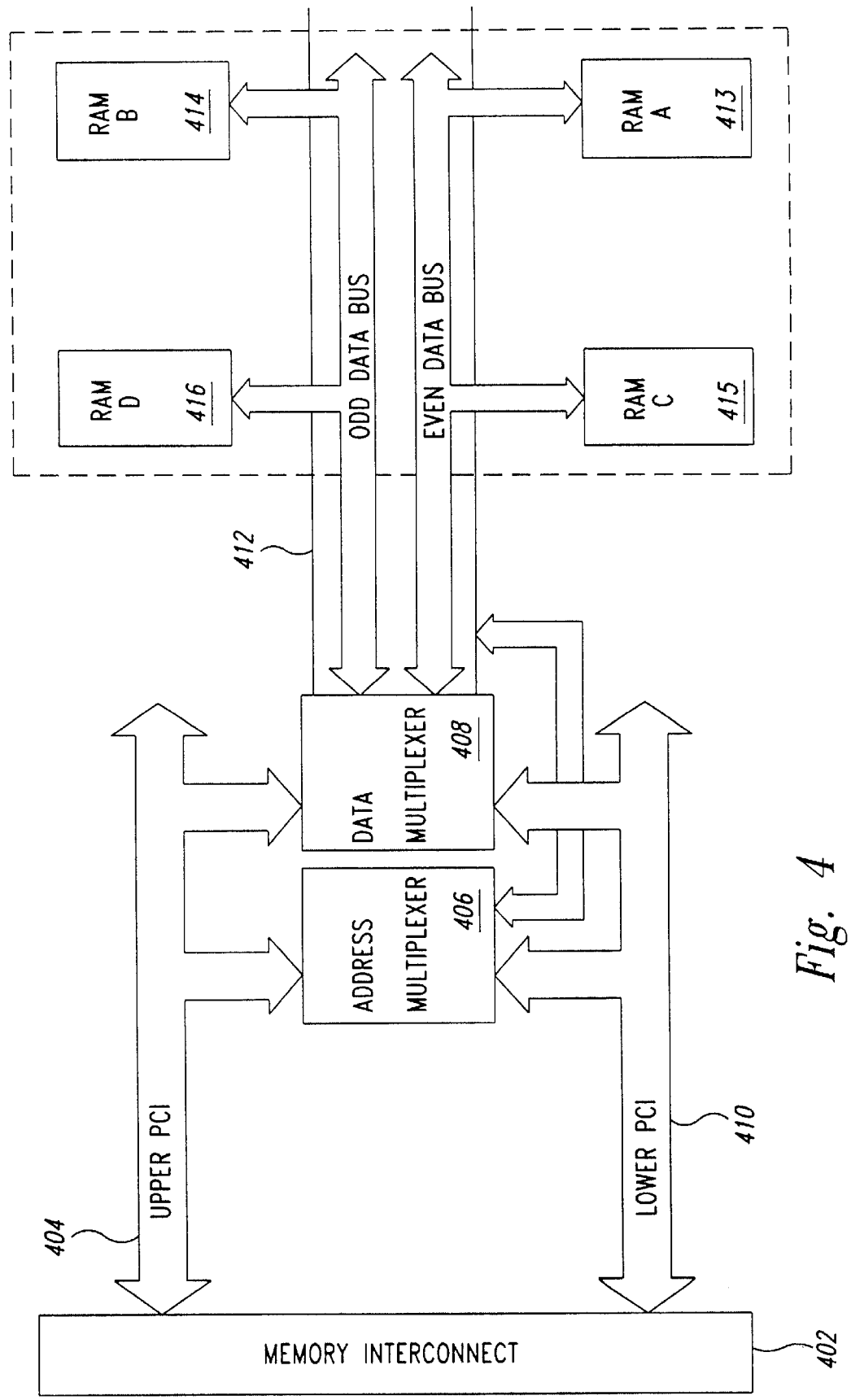
FIG. 4 is an architecture block diagram of one embodiment of the HPSM.

FIG. 4 is an architecture block diagram of one embodiment of the HPSM. The HPSM interconnects with two external PCI buses (not shown) through a memory interconnect 402. One of the PCI buses, the upper PCI bus 404, is connected to an address multiplexer 406 and a data multiplexer 408. The other PCI bus, the lower PCI bus 410, also connects to the address multiplexer 406 and the data multiplexer 408. The data multiplexer 408 and the address multiplexer 406 are, in addition, connected to a 64-bit bus 412 to which 4 2-MByte SRAMs 413–416 are also connected. The SRAMs together comprise an 8-MByte SRAM. The data multiplexer 408 and address multiplexer 406 interleave independent 32-bit accesses from both the upper PCI bus 404 and the lower PCI bus 410 with 64-bit SRAM accesses via the 64-bit bus 412.

Figure 5:
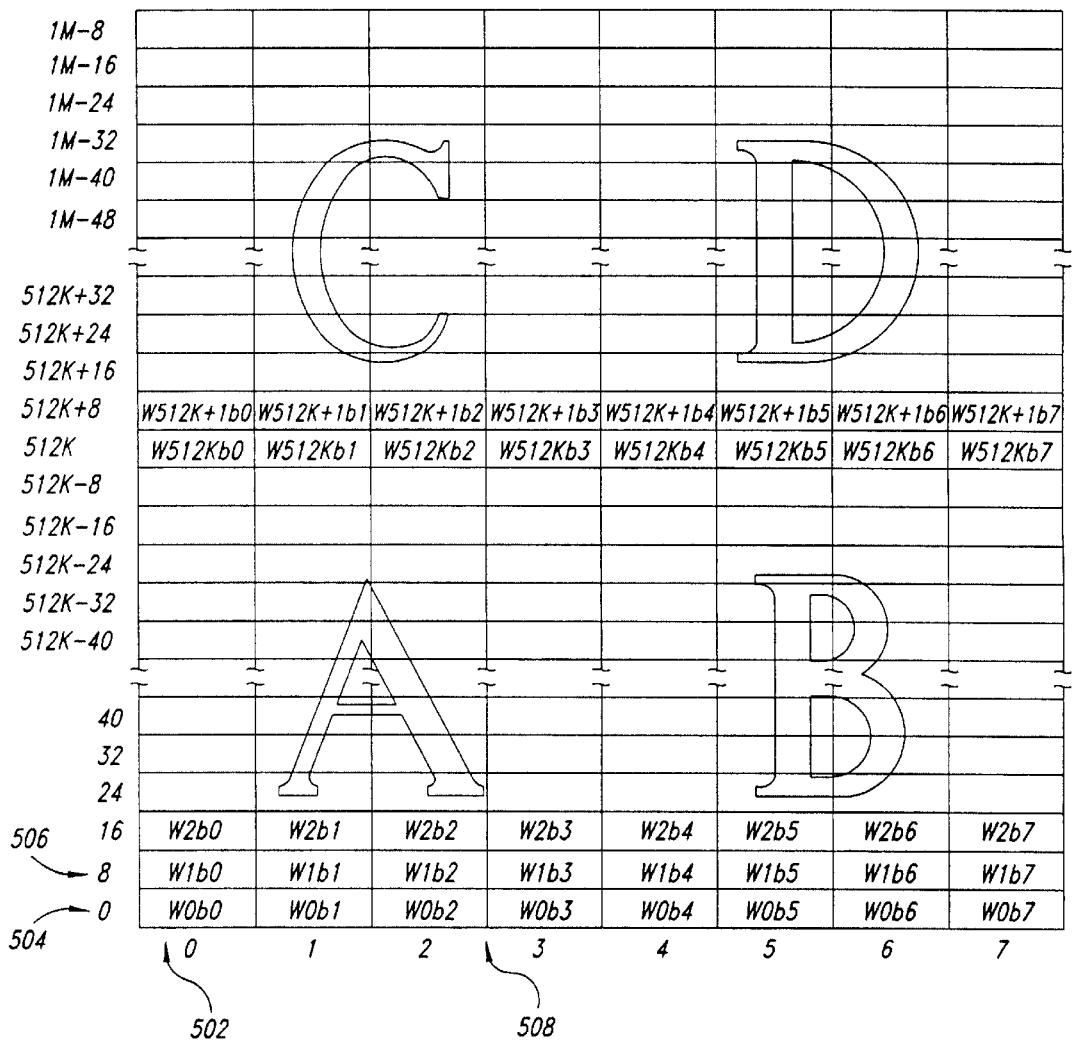
FIG. 5 illustrates a mapping of a 64-bit word linear address space onto the 4 2-MByte SRAMs.

FIG. 5 illustrates a mapping of a 64-bit word linear address space onto the 4 2-MByte SRAMs. The address space is conceptually a grid or array of address locations. The vertical columns in the grid, such as column 502, corresponds to bytes within 64-bit words. The rows of the grid, such as row 504, each corresponds to a 64-bit word. Thus, the 64-bit word with address O corresponds to row 504 within the grid representing the linear address space. The 64-bit word with address 1 corresponds to row 506 within the grid. That portion of the address space that includes the first 4 bytes, or first 32-bit words, within the first 512K (K=1,024) 64-bit words, corresponding to the lower left hand quadrant 508 within the address space grid is stored in memory locations within SRAM A 413 in FIG. 4. The upper 4 bytes, or upper 32-bit word in each of the first 512K 64-bit words within the linear address space, are stored in SRAM B 414 in FIG. 4. The lower 4 bytes, or lower 32-bit word, in the second 512K 64-bit words within the linear address space correspond to memory locations within SRAM C 415 in FIG. 4, and the upper 4 bytes, or upper 32-bit word, in the second 512K 64-bit words within the linear address space are stored within SRAM D 416 in FIG. 4. On each clock cycle, 1 64-bit word can be transferred from the linear address space shown in FIG. 5 to the data multiplexer, or vice versa.

Figure 6:
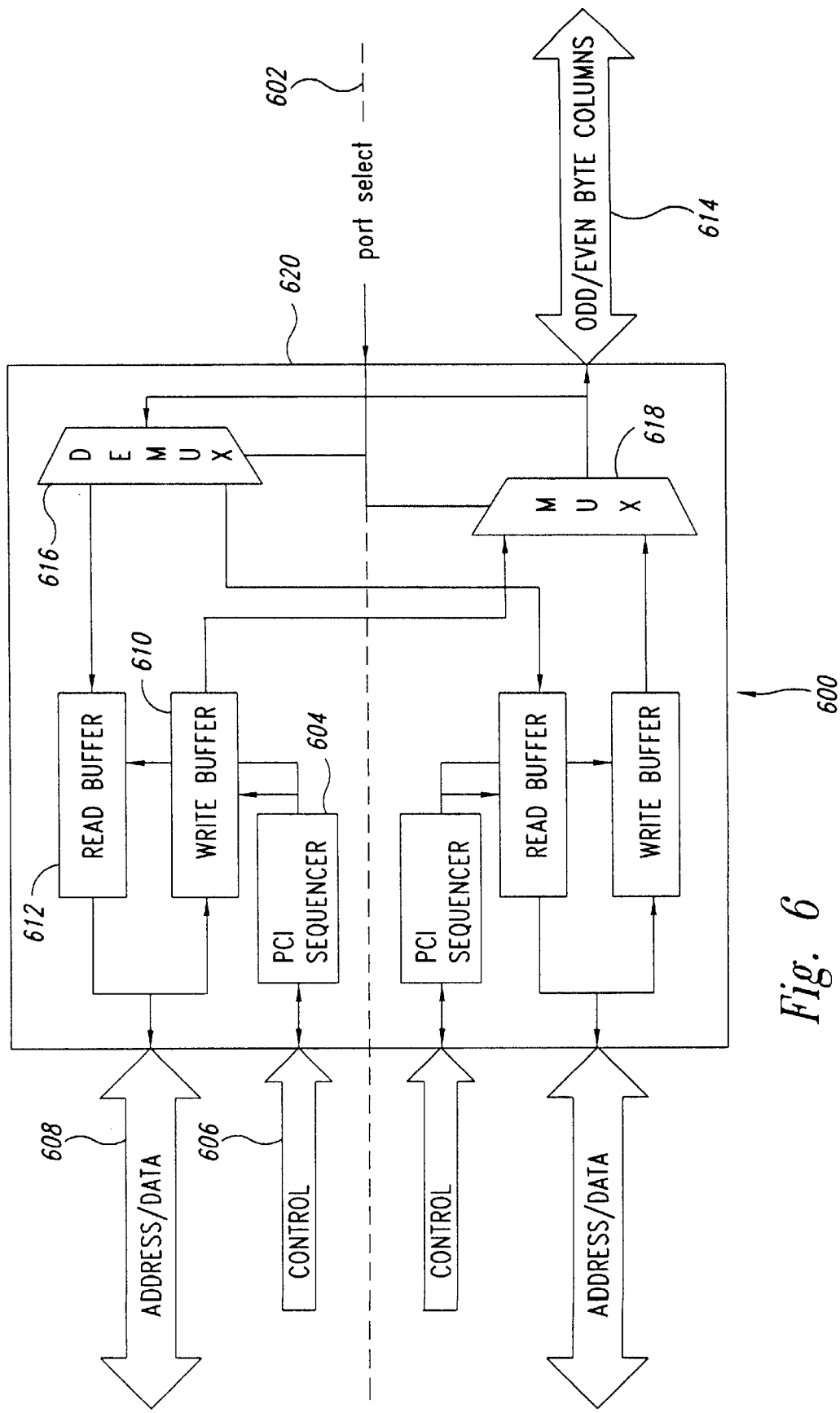
FIG. 6 is a block diagram of the data multiplexer.

FIG. 6 is a block diagram of the data multiplexer. The data multiplexer is largely symmetrical with respect to a horizontal dividing line 602. The components of the data multiplexer above the horizontal dividing line 602 are associated with the upper PCI bus (404 in FIG. 4), and the components below the horizontal dividing line 604 are associated with the lower PCI bus (410 in FIG. 4). In the interest of brevity, those components above the horizontal dividing line 602, associated with the upper PCI bus (404 in FIG. 4) or with both the upper and lower PCI buses will be described. The PCI sequencer 604 is connected to the control signal lines 606 of the upper PCI bus (404 in FIG. 4) and monitors the control signal lines 606 in order to determine when data transfers occur. Thus, for example, when data is being transferred from the data multiplexer 600 to the upper PCI bus (404 in FIG. 4), and the initiator of the transfer of the data to be transferred connected to the upper PCI bus introduces a wait state, or one or more empty cycles, as described above, the wait state is identified by the PCI sequencer 604 as a result of a deassertion of the PCI IRDY# control signal line (not shown). Data is transferred form the data signal lines 608 of the upper PCI bus (404 in FIG. 4) to a 96-bit write buffer 610. Data read from the SRAMs is written to a 96-bit read buffer 612. 64-bit data words are transferred between the data multiplexer 600 and the SRAMs via a 64-bit bus 614. 64-bit words read from the SRAMs are demultiplexed by a demultiplexer component 616 into 2 32-bit words that are written to the read buffer 612. 2 32-bit words read from the write buffer 610 are multiplexed by a multiplexer component 618 to 64-bit words that are written to the SRAMs via the 64-bit bus 614. A port select signal 620 indicates whether the upper PCI bus or the lower PCI bus (404 and 410 in FIG. 4, respectively) is currently selected to access the SRAMs via the 64-bit bus 614.

Figure 7:
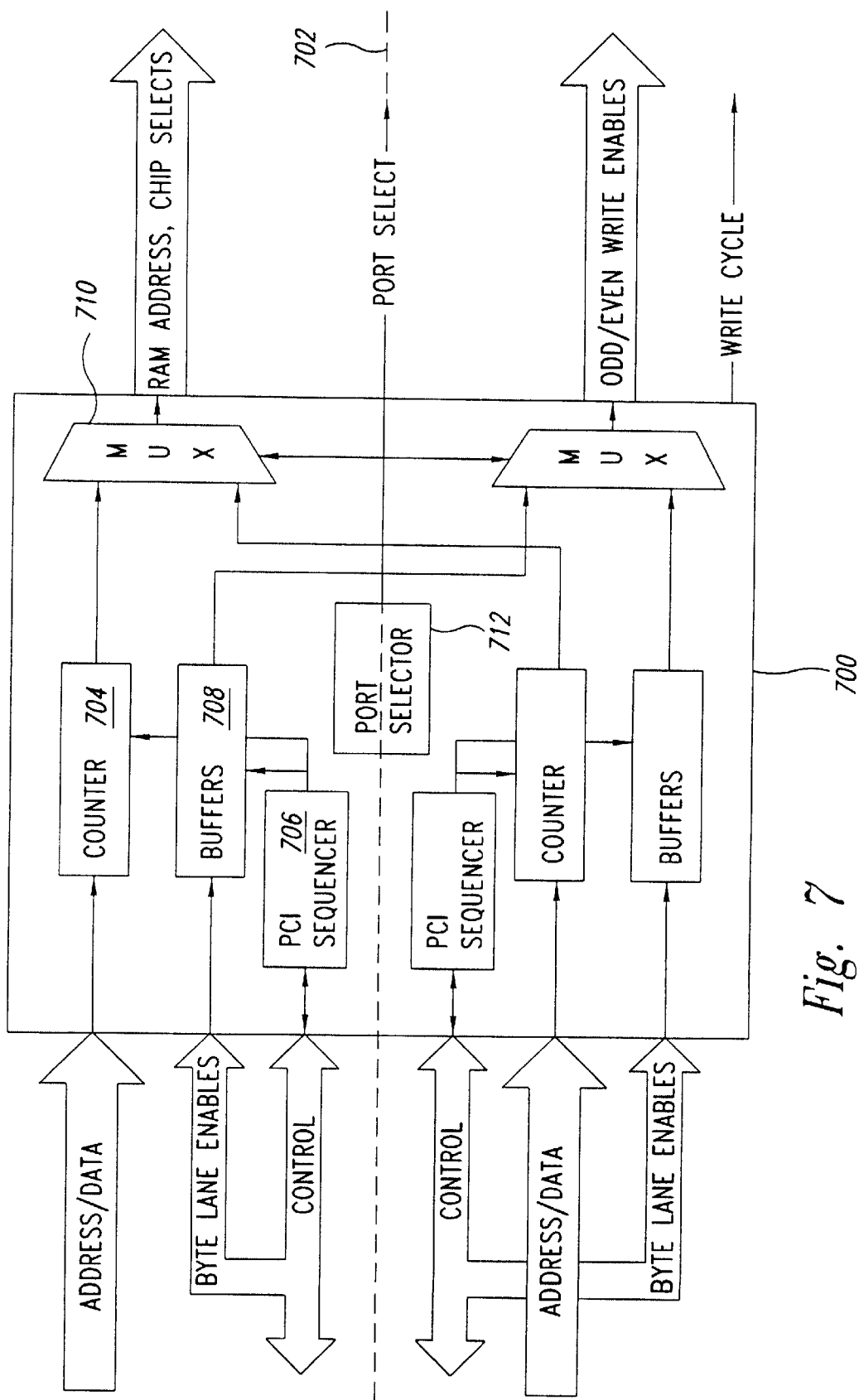
FIG. 7 is an architecture block diagram of the address multiplexer.

FIG. 7 is an architecture block diagram of the address multiplexer. As with the data multiplexer shown in FIG. 6, the address multiplexer 700 is symmetrical with respect to a horizontal dividing line 702. The components above the horizontal dividing line 702 are associated with the upper PCI bus (404 in FIG. 4), and the components of the address multiplexer 700 below the horizontal dividing line 702 are associated with the lower PCI bus (410 in FIG. 4). In the interest of brevity, only the components above the horizontal dividing line 702 will be described. A counter 704 is loaded during the PCI bus address phase and is incremented as data is read from or written to the SRAMs. The PCI sequencer 706 is connected to the control signal lines of the upper PCI bus (404 in FIG. 4) and operates analogously to the PCI sequencer 604 in FIG. 6, except that, in response to state changes on the upper PCI bus, the PCI sequencer 706 asserts appropriate control signals to control reading and writing operations to and from the SRAMs, including updating address counters. Buffers 708 store byte lane enable vectors during write transactions which direct values to particular 32-bit words within the 64-bit linear address space provided by the SRAMs. A multiplexer PLD 710 multiplexes 32-bit addresses from the address signal lines of the upper PCI bus into 64-bit SRAM linear address space addresses. The port selector 712, shared between both symmetrical sides of the address multiplexer 700, alternately asserts and deasserts the port selector signal that is passed to the data multiplexer (600 in FIG. 6).

FIGS. 8A–8E, 9A–9E, and 10A–10F illustrate the operation of the HPSM during simultaneous writing and reading operations to and from the SRAMs. The simplified components in all of these figures are the same, and will be described only once with respect to FIG. 8A, and will be identically labeled throughout. SRAMs A–D are represented by grids 802, 804, 806, and 810 in FIG. 8A. The data multiplexer 812 is connected with the SRAMs 802, 804, 806, and 810 via the 64-bit bus 814. In FIGS. 8A–8E and 9A–9E, data is being written from the lower PCI bus 816 (410 in FIG. 4) and is being transferred to the upper PCI bus 818 (404 in FIG. 4). In FIGS. 10A–10F, data is being transferred to the data multiplexer 812 from both the upper and lower PCI buses 818 and 816, respectively. For reading operations, the 96-bit data multiplexer read buffer is shown as 3 32-bit words, an even address word ("E") 820, an odd address word ("O") 822, and a read head ("H") 824. For write operations, the 96-bit write buffer within a data multiplexer 812 is also shown as 3 32-bit words: E 825, O 826, and a third 32-bit buffer called "P" 828. The port selector signal is shown as a circle and arrow 830 that points to the PCI bus, lower 816 or upper 818, which currently can access the SRAMs. In FIGS. 8A–8E, the lower PCI bus 816 will write a block of data consisting of the 32-bit word values 101, 102, 103, and 104, to successive 64-bit words within the SRAMs starting at the first 64-bit word 832 in the upper portion of the linear address space corresponding to SRAMs C and D 806 and 810. The upper PCI bus 818 will read successive 64-bit words from the SRAMs starting at the first word 834 of the lower half of the linear address space corresponding to SRAMs A and B 802 and 804, respectively. The values in the 32-bit words within these 64-bit words are 1, 2, 3, 4, 5, and 6. This same pattern of values and pattern of data transfers will be used, with slight alternations, in FIGS. 9A–9E, 10A–10F, and 11.

Figure 8A:
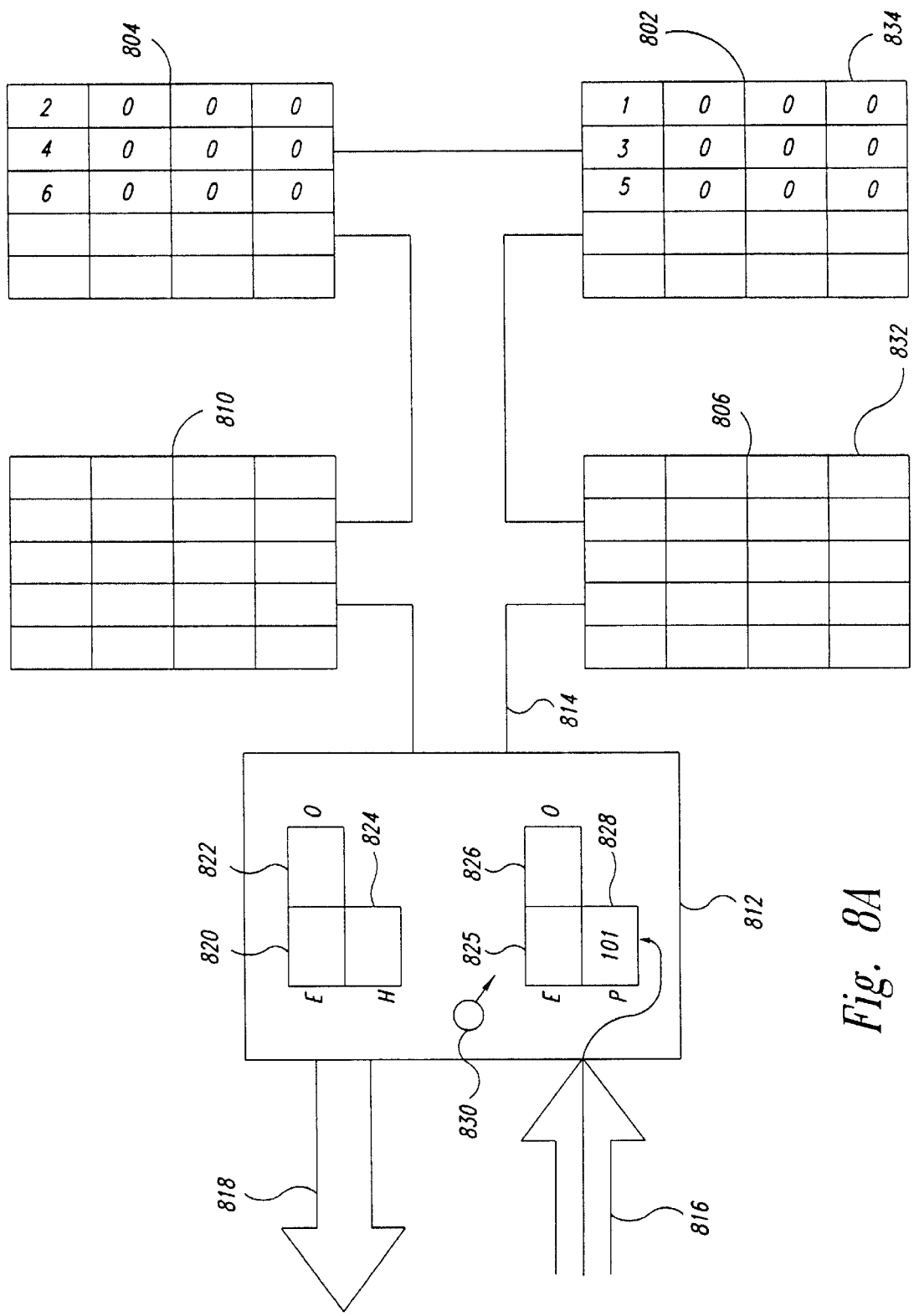
Figure 8B:
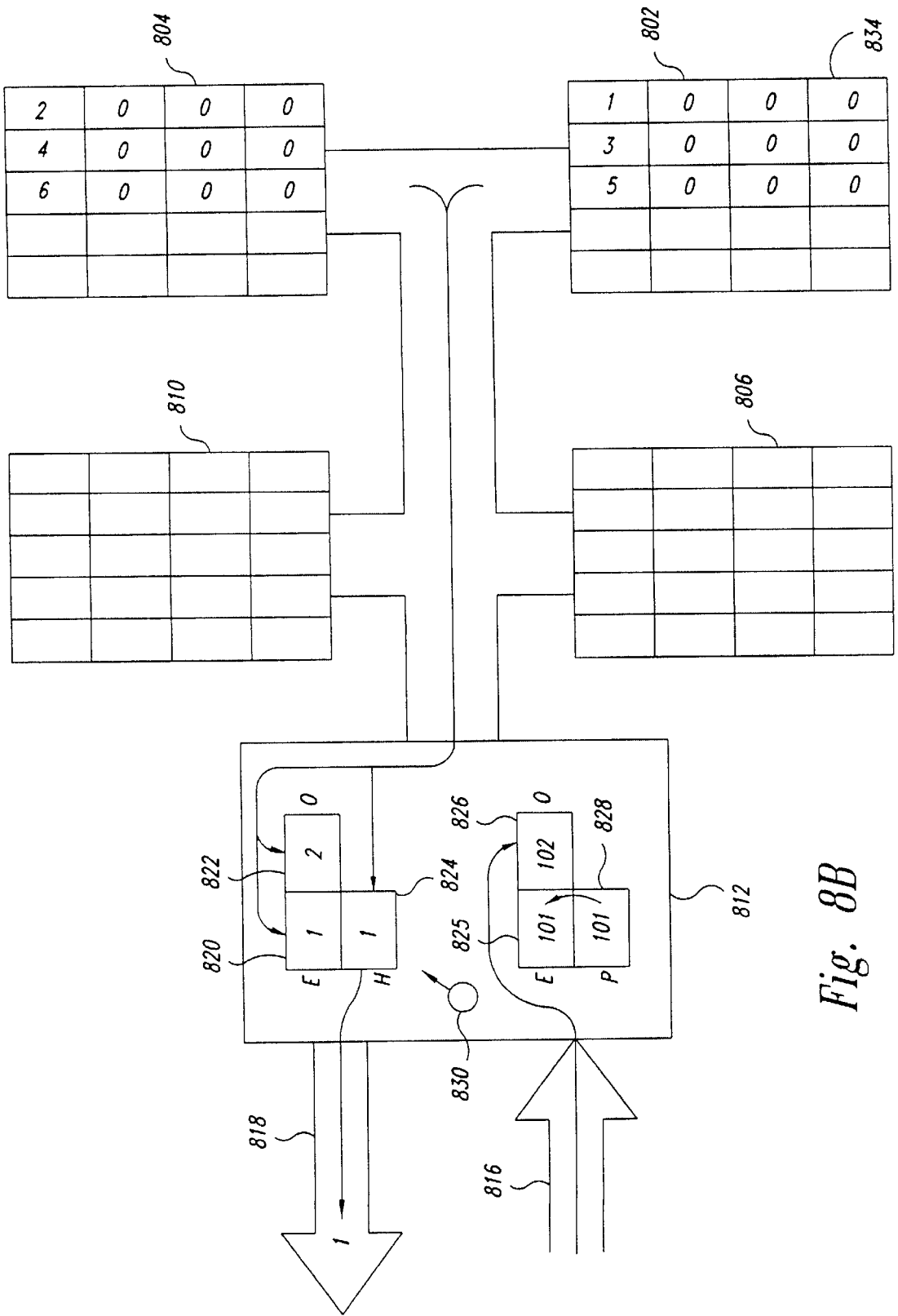
Figure 8C:
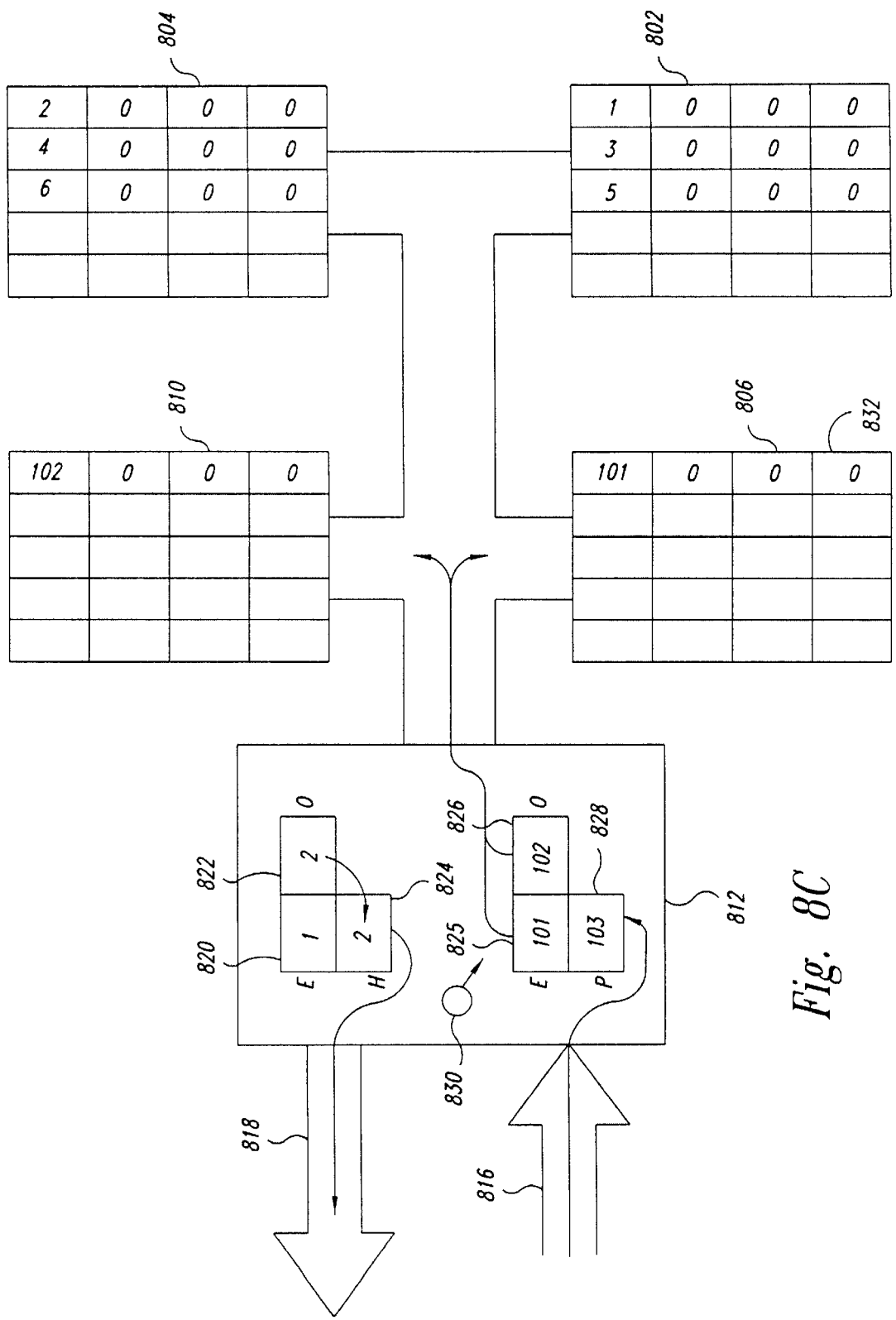
Figure 8D:
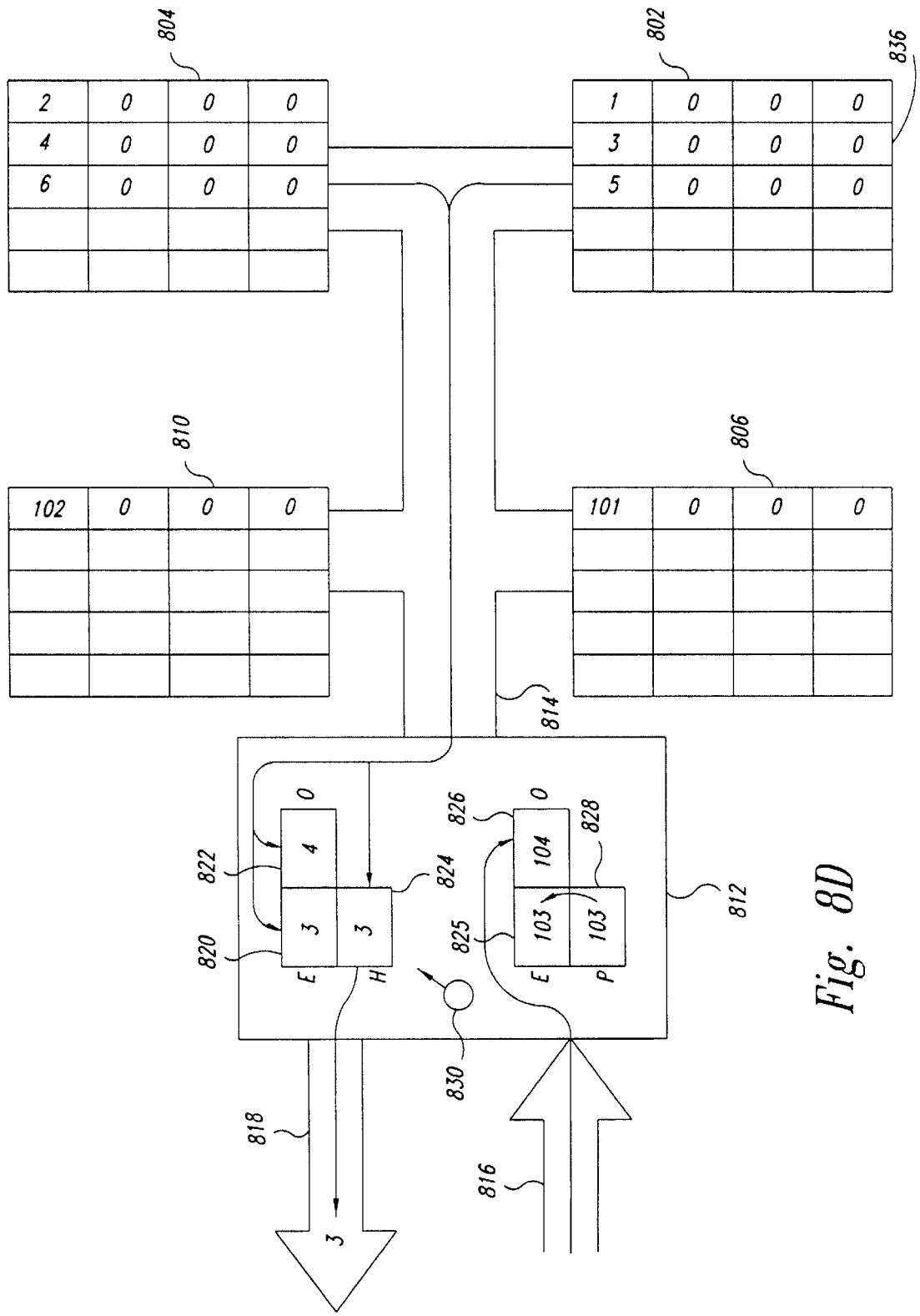
Figure 9A:
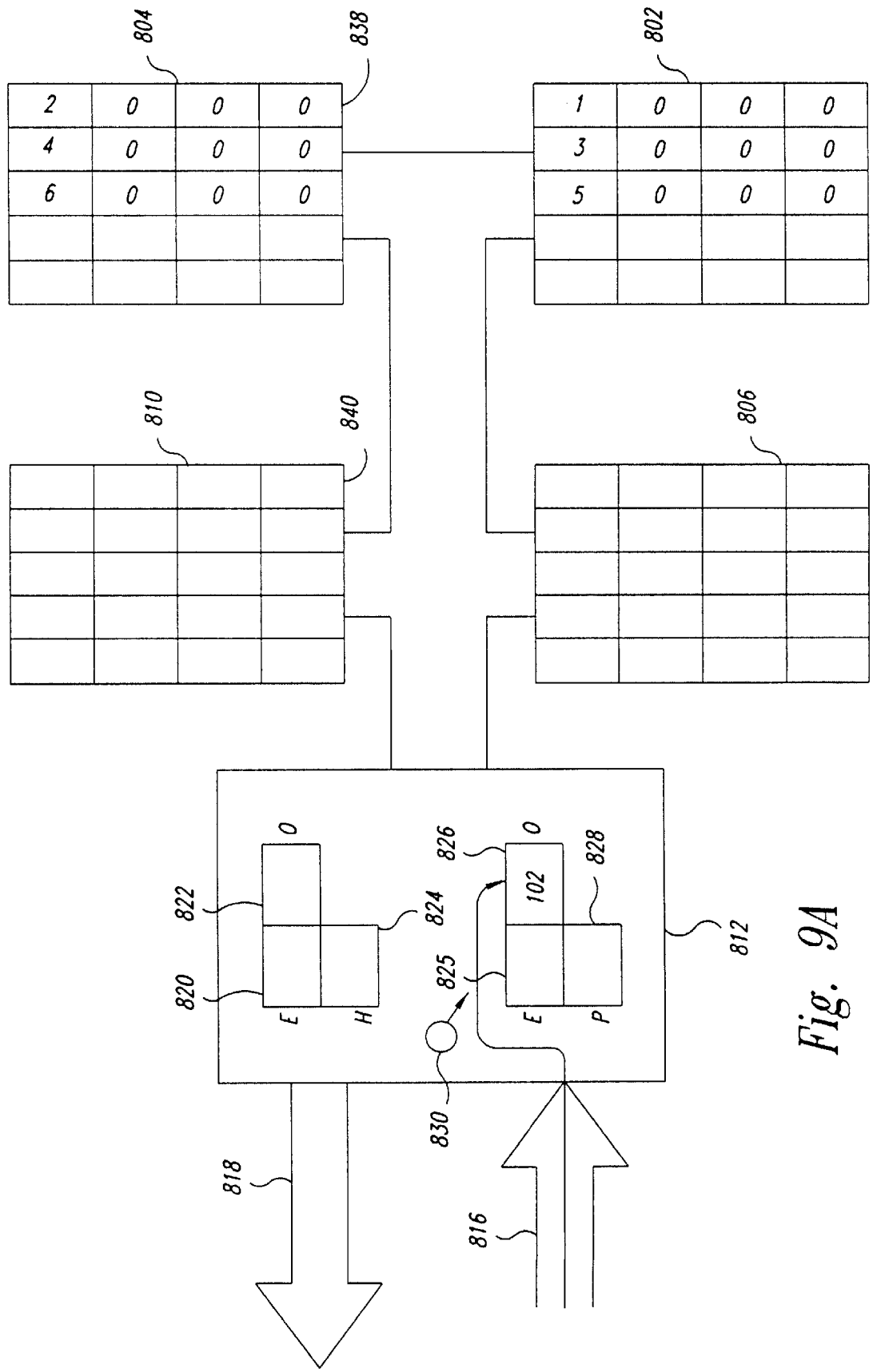
Figure 9B:
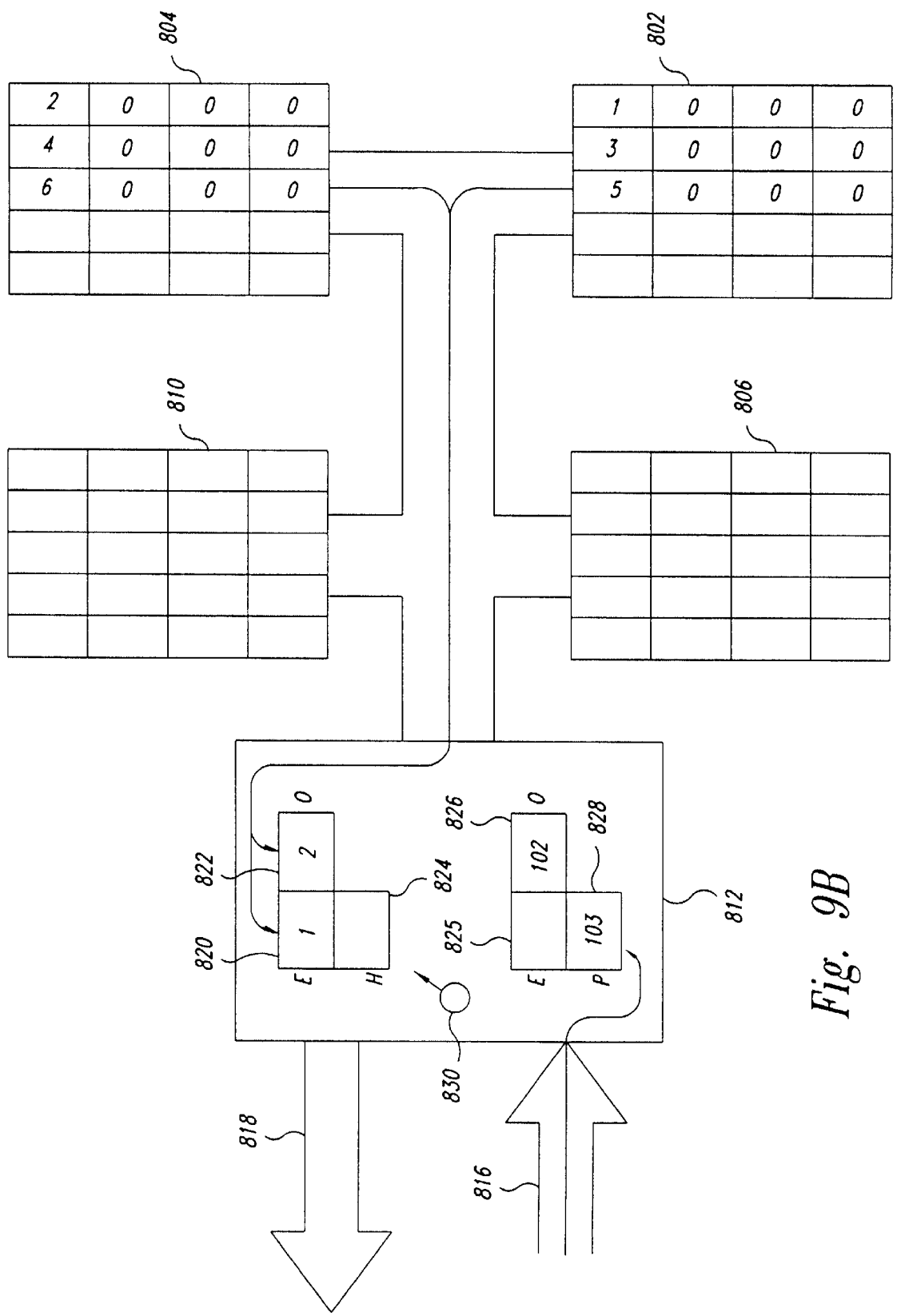
Figure 9C:
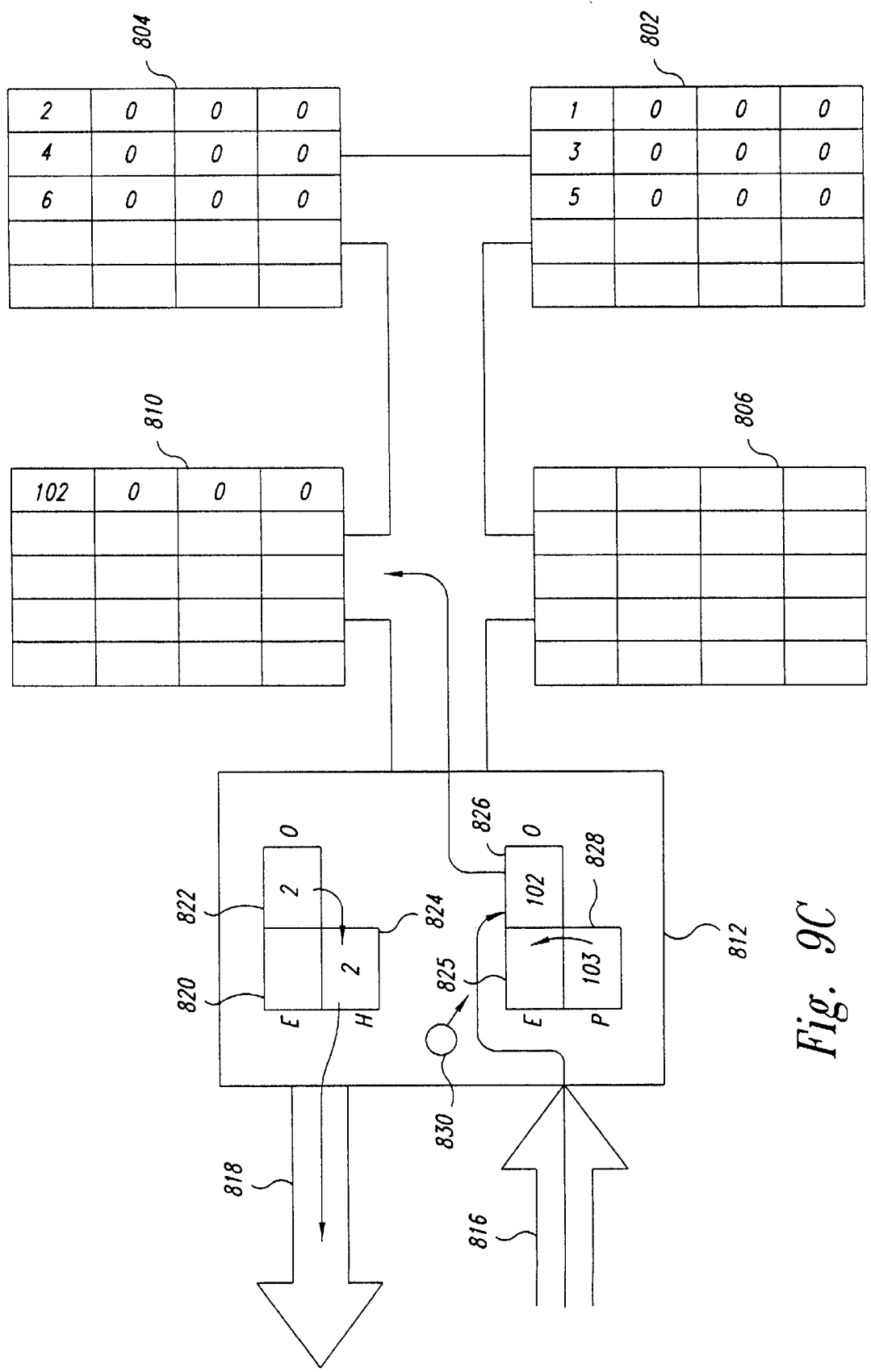
Figure 9D:
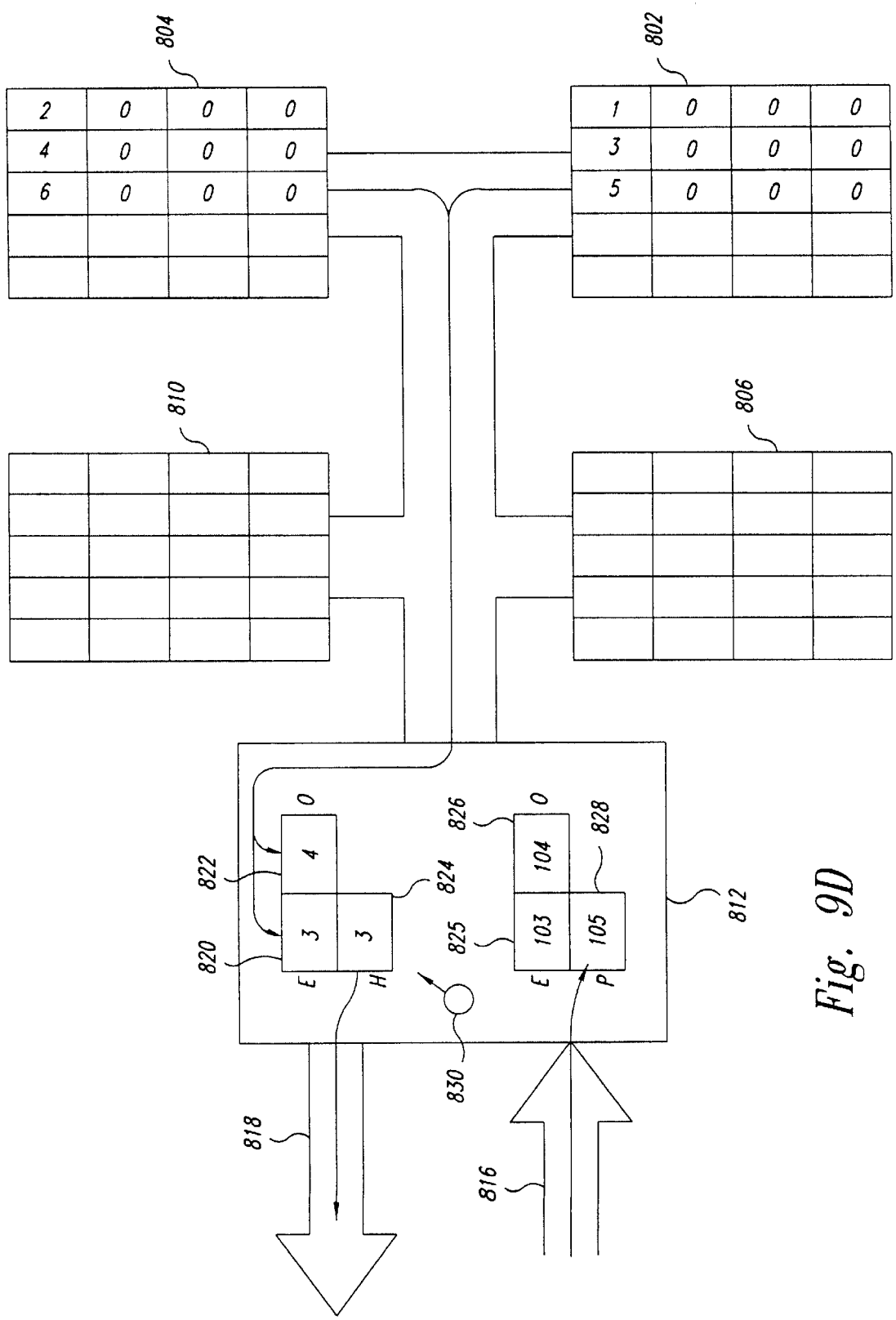
Figure 9E:
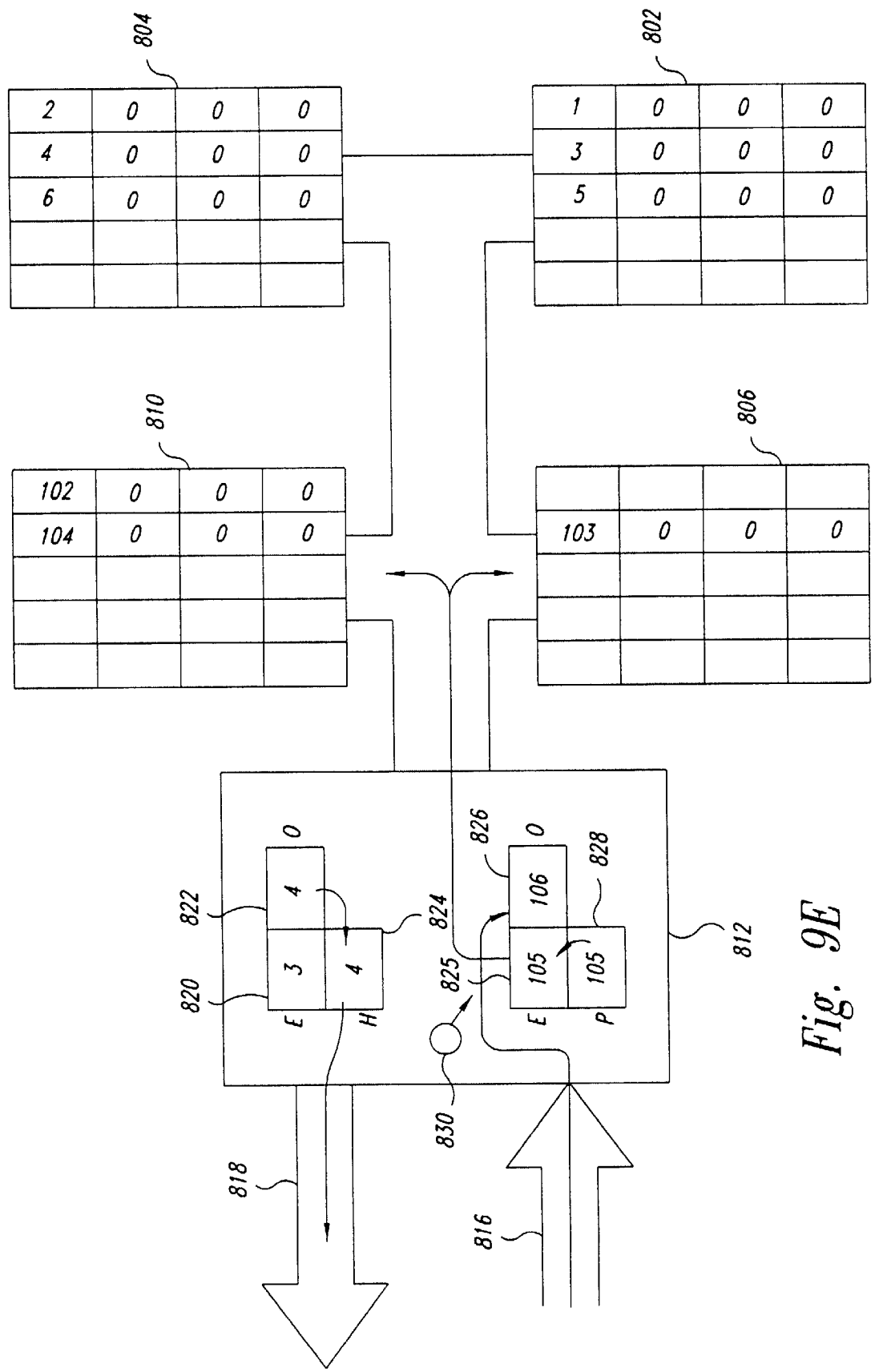
Figure 10A:
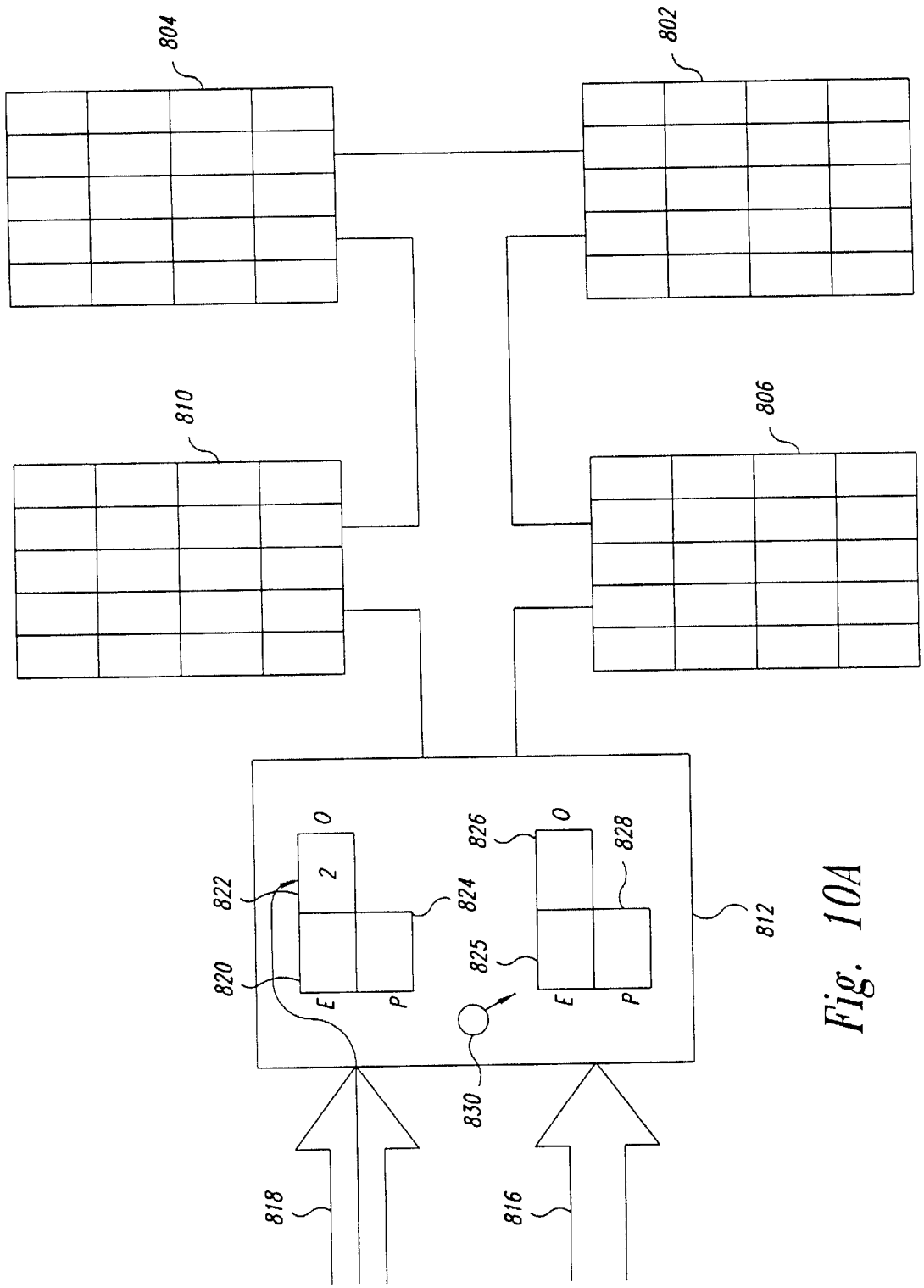
Figure 10B:
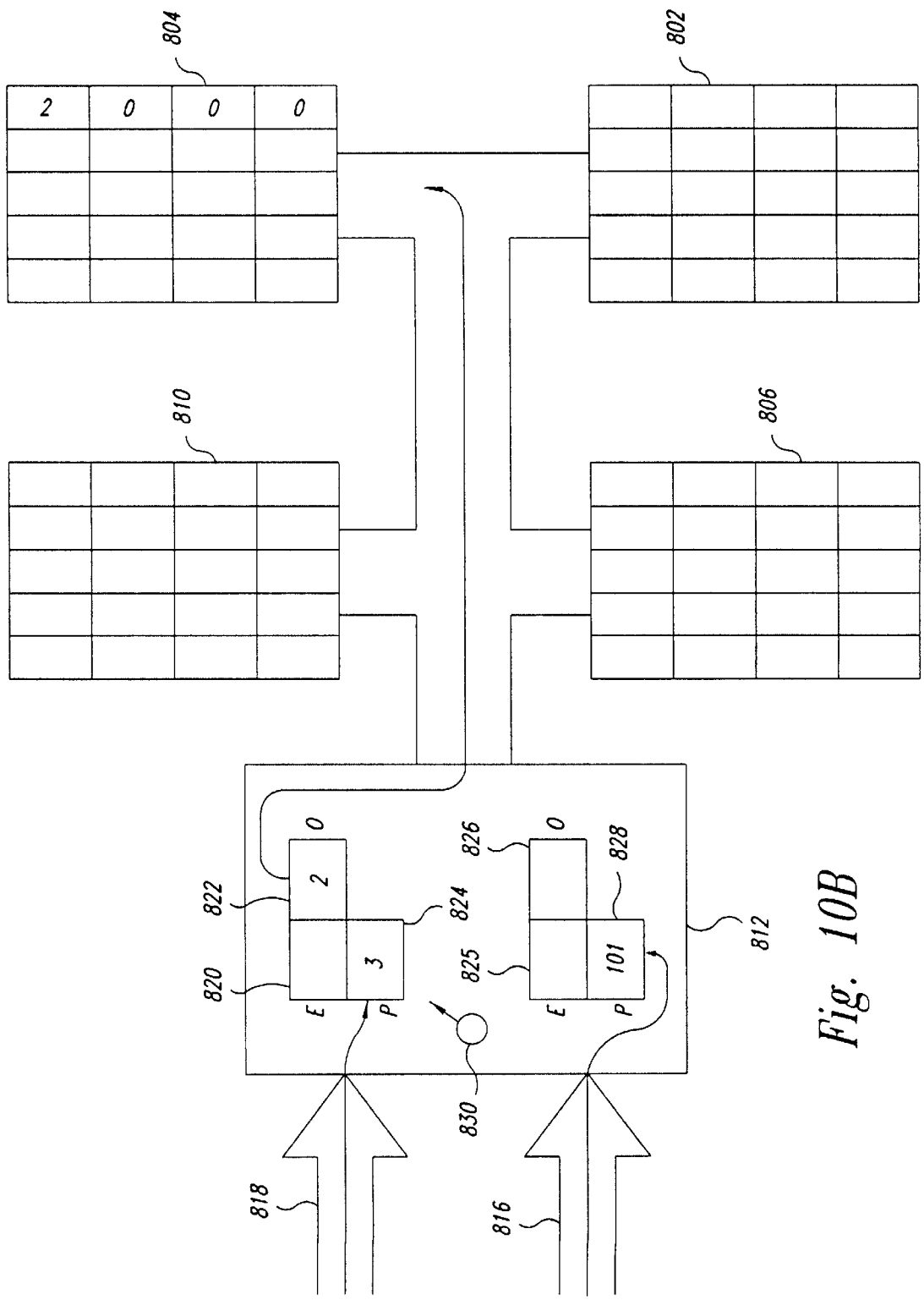
Figure 10C:
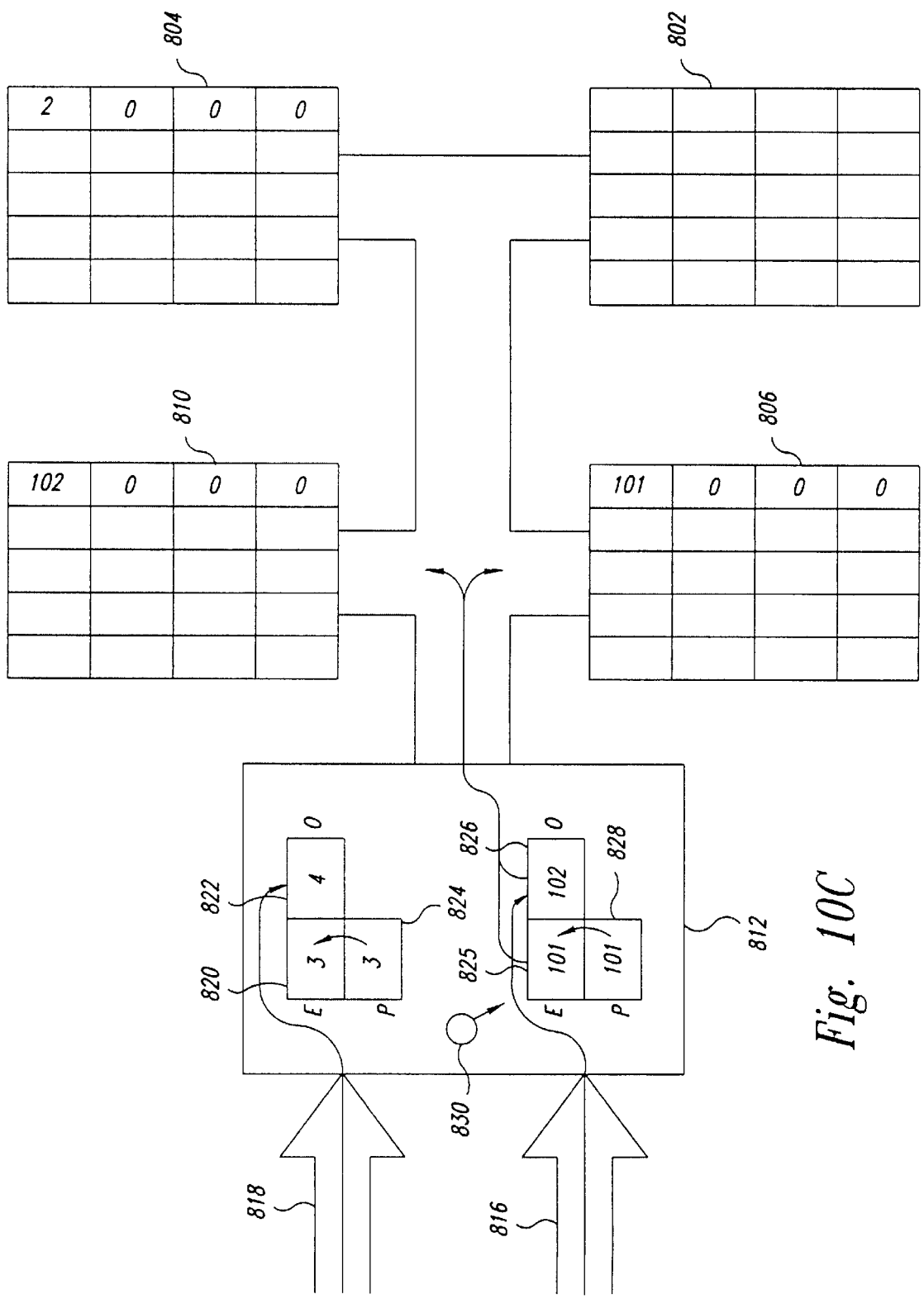
Figure 10D:
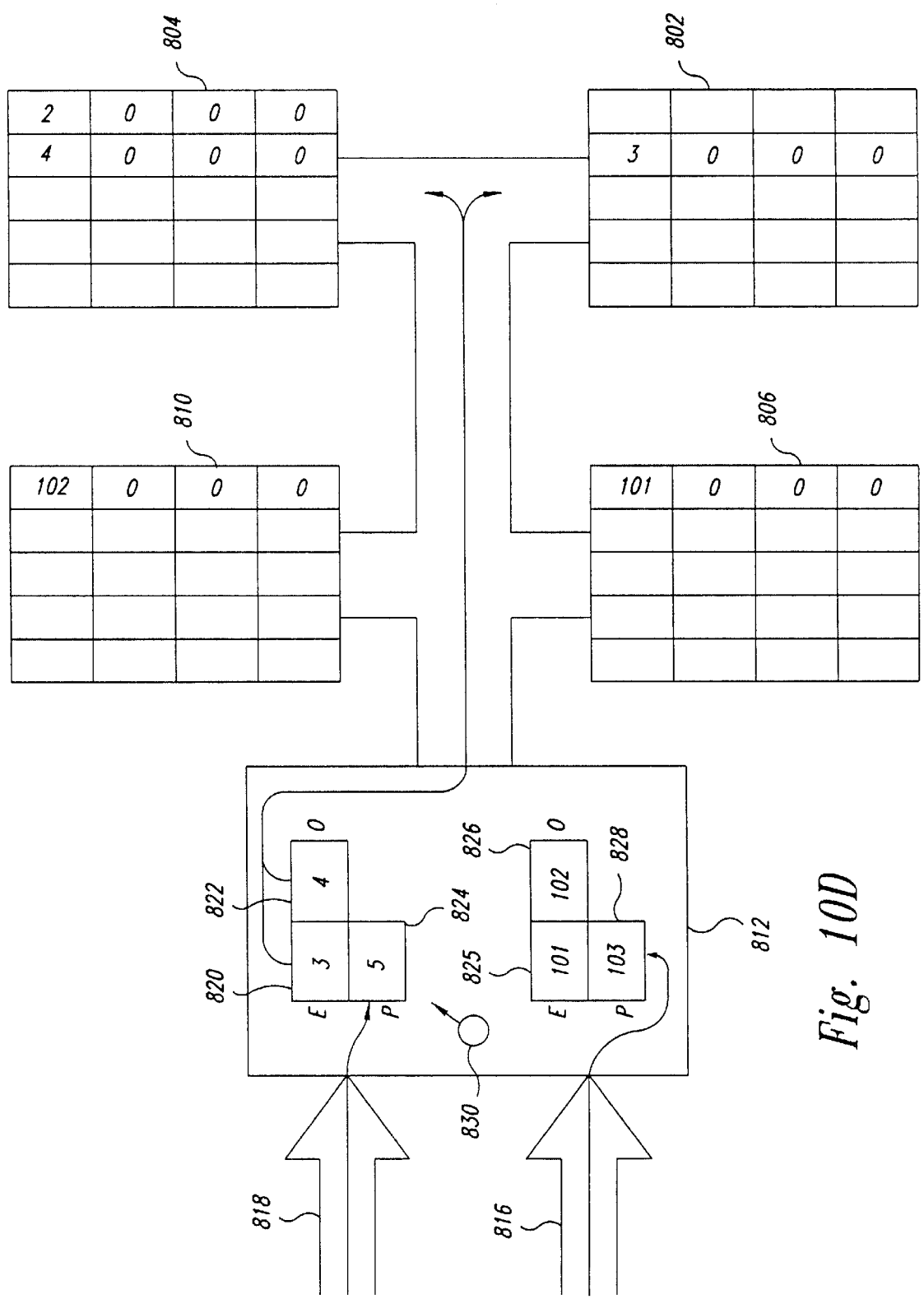
Figure 10E:
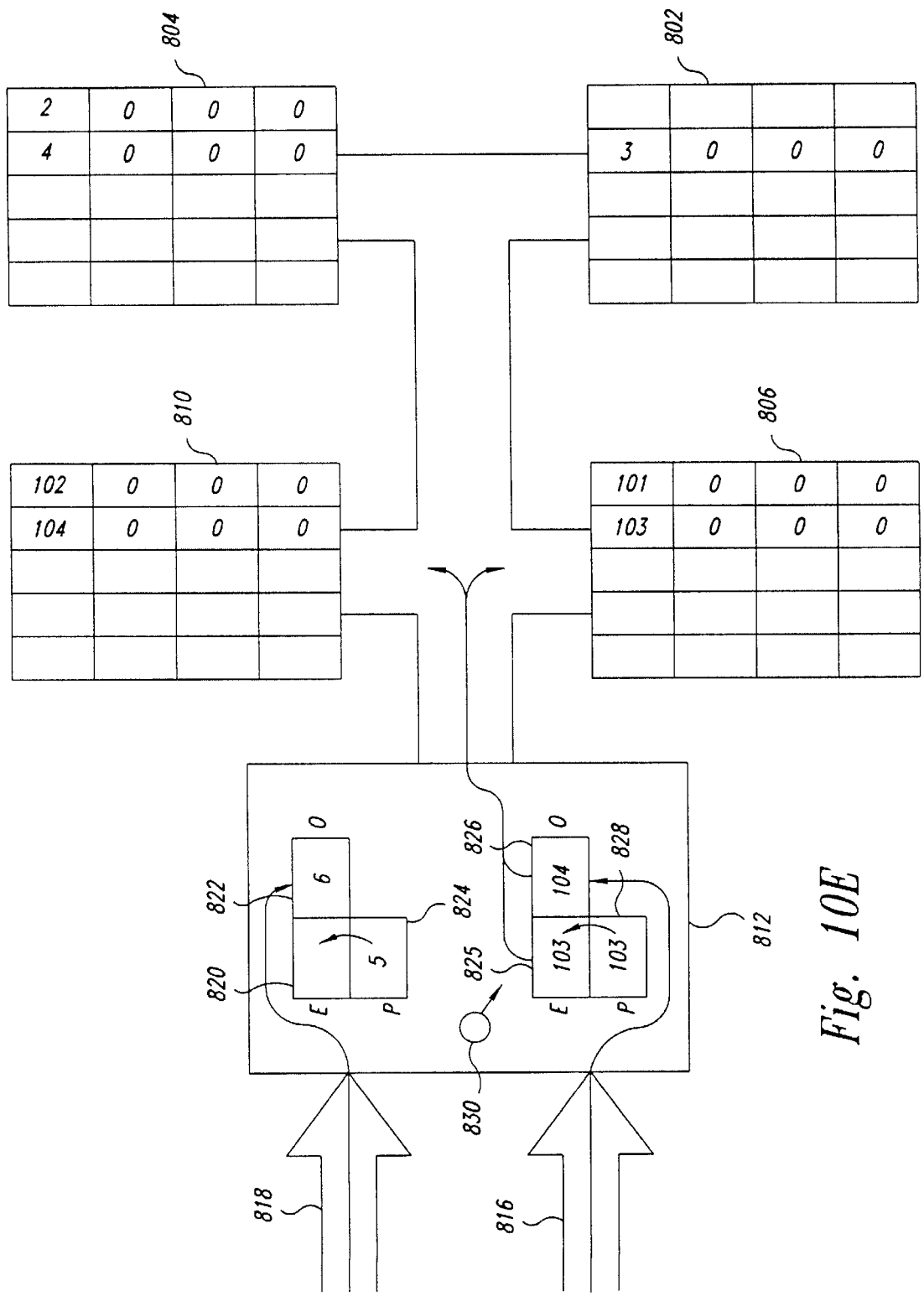
Figure 10F:
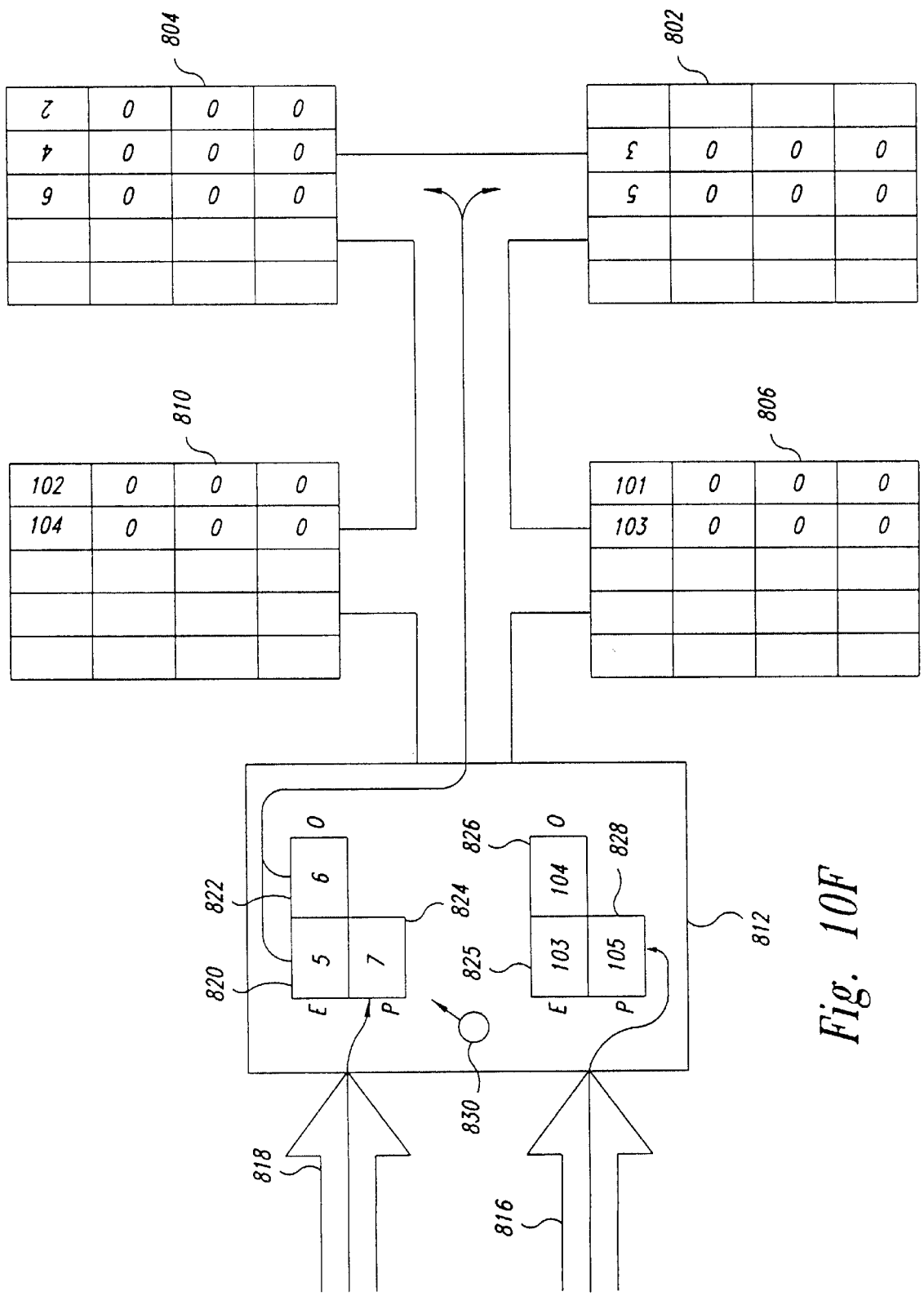

FIG. 8A begins with the port selector selecting the lower PCI bus 816. The lower PCI bus transfers the first 32-bit word or the value 101, to P 828. In FIG. 8B, representing the next successive clock cycle following the clock cycle in FIG. 8A, the port selector 830 indicates that the upper PCI bus 818 is currently selected. Since a read operation is being undertaken on the upper PCI bus, and since the upper PCI is bus selected to access the SRAMs, the first 64-bit word 834 from the SRAMs is transferred to the data multiplexer 812 and demultiplexed into 2 32-bit words which are stored in E and O, respectively. Concurrently, the first 32-bit word, or even word, is also written to H. When the word is written to H, it is transferred to the upper PCI bus 818. At the same time, the lower PCI bus 816 transfers the second 32-bit word, 102, into O 826 and the value 101 in P 828 is moved into E 825. In FIG. 8C, representing the next clock cycle following the clock cycle of FIG. 8B, the port selector 830 again points to the lower PCI bus. The values stored in E and O, 825 and 826, respectively, are multiplexed into a 64-bit word and written to the first 64-bit address location in the upper half of the SRAMs 832. At the same time, a third 32-bit word with the value 103 is written from the lower PCI bus 816 into P 828. FIG. 8D represents the next clock cycle following the clock cycle of FIG. 8C. The port selector 830 again points to the upper PCI bus 818. The second 64-bit word and the lower half of the 64-word linear address space 836 is transferred via the 64-bit bus 814 to the data multiplexer 812, demultiplexed, and stored in E 820 and O 822. At the same time, the even, addressed 32-bit word within the transfer to 64-bit word, with the value 3, is written to H 824, resulting in transfer of the value 3 to the upper PCI bus 818. At the same time, the 32-bit word with the value 104 is written from the lower PCI bus 816 to O 826, and the value 103 in P 828 is moved to E 825. Finally, FIG. 8E shows the clock cycle following the clock cycle in FIG. 8D. The port selector 830 indicates that the lower PCI bus now has access to the SRAMs. The contents of E and O, 825 and 826, are multiplexed into a 64-bit word that is transferred via the 64-bit bus 814 to the second address location within the upper half of the 64-bit word linear address space 838. At the same time, the value 105 is written from the lower PCI bus 816 to P 828. The value 4 in O 822 is transferred to H 824, resulting in transfer of the value 4 to the upper PCI bus 818. Consideration of FIGS. 8A–8E shows that the read and write data transfers will continue to proceed in the same pattern as that established in these first five cycles. The set of rules controlling the operation of the HPSM during this data transfer operations is straightforward. In the case of a read transfer, the address counter indicating from which address to read the next 64-bit word from SRAMs is incremented when the value in O 822 is written H 824. The address counter during a write operation is incremented when a 32-bit word is written from the PCI bus to O. The port select alternates between the two PCI buses at each clock cycle.

FIGS. 9A–9E illustrate similar read and write operations as were illustrated in FIGS. 8A–E, except both the read and write operations start with the upper, or odd, 32-bit word in the first 64-bit word of the lower and upper portions of the linear address space 838 and 840, respectively. FIGS. 10A–10F illustrate two simultaneous write operations, using the same data patterns used in FIGS. 8A–8E and 9A–9E, with the difference that the write operations begin on alternate clock cycles from the beginning of the write operations in FIGS. 8A–8E and 9A–9E. Together, FIGS. 8A–8E, 9A–9E, and 10A–10E illustrate how, by demultiplexing and multiplexing between 32-bit PCI buses, internal buffers, and a 64-bit memory, both PCI buses can independently access the HPSM at full data transfer rate, i.e., a 32-bit word is transferred between each PCI bus and the HPSM on each clock cycle.

Figure 11:
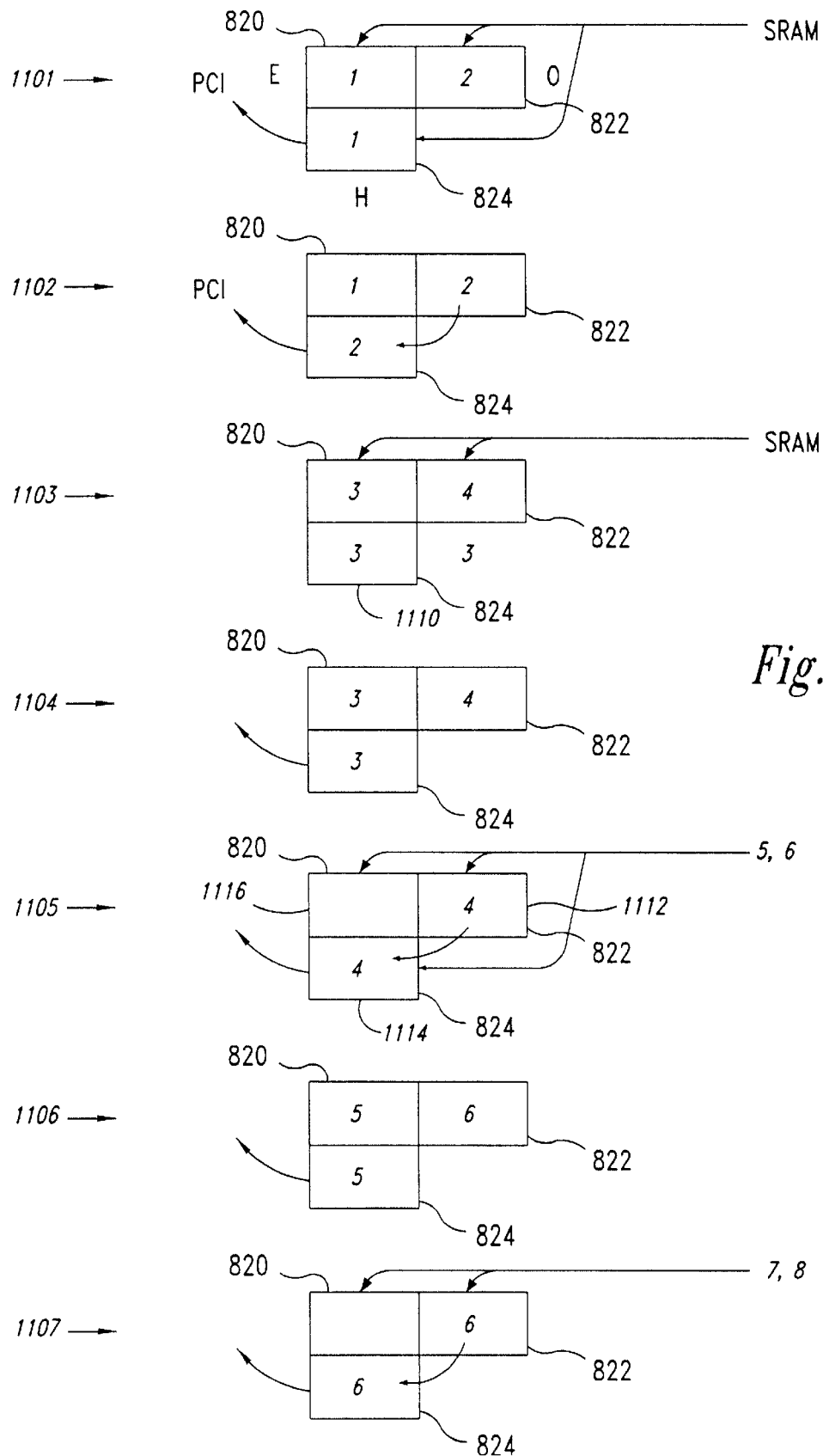
FIG. 11 illustrates the recovery following a wait state imposed by a PCI bus during a read operation.

FIG. 11 illustrates the recovery following a wait state imposed by a PCI bus during a read operation. The E, O, and H components of the 96-bit read buffer 820, 822, and 824 in FIG. 8A, respectively, are shown for seven different clock cycles, 1101–1107. The same transfer as illustrated starting at FIG. 8B is shown in FIG. 11. Clock cycles 1101–1103 correspond to FIGS. 8B–8D. However, unlike in FIG. 8D, in clock cycle 1103, although the value 3 in H 1110 has been transferred to the PCI bus, the initiator on the PCI bus indicates that it cannot accept a value at this time. Thus, the transfer is stalled. In clock cycle 1104, the initiator again indicates a willingness to accept the value and the value 3, already transferred to the PCI bus in clock cycle 1103, is still available and is transferred to the initiator. Now, however, the regular cycle established in cycles 1101–1103 has been interrupted. In clock cycle 1105, the value 4 is available in O 1112 for transfer to H 1114 and out to the PCI bus. However, at this point, in the normal pattern for a read operation, data should be transferred on the 64-bit bus to E and O, 1116 and 1112, respectively. Because of the buffering scheme and bus operation cycles, it is possible, following transfer of the value 4 from H 1114 to the PCI bus, to read the values 5 and 6 demultiplexed from the next 64-bit word and subsequently place them in E and O, 1116 and 1112. Thus, a regular pattern can be reestablished starting with cycle 1106.

Although the present invention has been described in terms of a particular HPSM embodiment, it is not intended that the invention be limited to this embodiment. Modifications within the spirit of the invention will be apparent to those skilled in the art. For example, the address multiplexer and data multiplexer, illustrated in FIGS. 6 and 7, may be implemented in a number of different ways using a number of different internal components. As another example, different numbers of SRAMs can be used to construct a variety of different types of linear address spaces. Buses other than PCI buses may be served by the HPSM, including buses of different of data widths. For example, 2 64-bit buses could be served by an HPSM connected to 128-bit addressable SRAM complex via a 128-bit bus. Different embodiments of the HPSM may be used in a number of different types of computer hardware devices and computer systems.

The foregoing description, for the purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. For example, one embodiment of the invention makes use of standard clock frequency doubling techniques, allowing more efficient processing of state, and minimal latencies and data flow between the SRAM memory bus and the respective memory interconnect buses. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A high-performance dual-ported shared memory that provides independent storage and retrieval operations on blocks of computer words to a first computer bus and to a second computer bus without introducing wait states in either computer bus following initiation of a storage or retrieval operation, both computer buses controlled by a clock and providing transfer of a computer word having a first width during each clock cycle, the high-performance dual-ported shared memory comprising:

a first port connected to the first computer bus;

a second port connected to the second computer bus;

a memory component that provides an address space of memory words having a second width equal to twice the first width; and a multiplexer/demultiplexer component that combines pairs of computer words received from the first computer bus via the first port into memory words and that combines pairs of computer words received from the second computer bus via the second port into memory words for storage in the memory component and that separates memory words retrieved from the memory component into pairs of computer words, both computer words of each pair provided by the multiplexer/demultiplexer component to either the first or the second computer bus via the first or second port, the multiplexer/demultiplexer component buffering computer words so that, on each clock cycle, the multiplexer/demultiplexer component transfers a computer word to, or receives a computer word from, each computer bus and transfers a memory word to, or receives a memory word from, the memory component.

2. The high-performance dual-ported shared memory of claim 1 further including a memory bus that provides transfer of a memory word between the multiplexer/demultiplexer component and the memory component during each clock cycle.

3. The high-performance dual-ported shared memory of claim 1 wherein the multiplexer/demultiplexer component further comprises:

an address multiplexer/demultiplexer component that receives target computer bus addresses from the first and second computer buses via the first and second ports and translates the target computer bus addresses into target memory word addresses; and a data multiplexer/demultiplexer component that
concurrently receives computer words from the from the first and second computer buses, buffers the received computer words in a write buffer corresponding to the first port and in a write buffer corresponding to the second port, combines pairs of buffered computer words into memory words, and provides the memory words to the memory component for storage at target memory addresses; and
receives memory words retrieved from target memory word addresses of the memory component, separates the received memory words into pairs of computer words, buffers the pairs of computer words in a read buffer corresponding to the first port and in a read buffer corresponding to the second port, and provides one computer word from the read buffer to each port during every clock cycle.

4. The high-performance dual-ported shared memory of claim 3 wherein the data multiplexer/demultiplexer component further comprises a first computer bus sequencer corresponding to the first computer bus and a second computer bus sequencer corresponding to the second computer bus, the first and second computer bus sequencers monitoring their corresponding computer buses to detect state changes in the computer buses and controlling read and write buffer operations in response to detected state changes.

5. The high-performance dual-ported shared memory of claim 3 wherein the address multiplexer/demultiplexer component further comprises:

a port selector that alternately asserts and deasserts a port selector signal to alternately select one of the two ports during each clock cycle, the memory component accessed for storing or retrieving a memory word on behalf of the computer bus associated with the selected port; and first and second computer bus sequencers corresponding to the first and second computer buses, respectively, that monitor their corresponding computer buses to detect state changes in the computer buses and that control data exchanges between the read and write buffers, the computer buses, and the memory components in response to the detected state changes.

6. The high-performance dual-ported shared memory of claim 1 wherein computer words have a first width of 32 bits, wherein memory words have a second width of 64 bits, and wherein the read and write buffers each comprise 3 32-bit computer words.

7. The high-performance dual-ported shared memory of claim 1 wherein the computer buses are 32-bit PCI buses and the memory component comprises 4 2-megabyte static random access memory devices that together provide an 8-megabyte linear address space of 64-bit words.

8. A method for providing a memory that is independently and concurrently accessible to a number of computer buses, controlled by a clock, without introducing wait states during transfer of blocks of computer words to and from the memory, the method comprising:

for each of the number of computer buses, providing a port through which the computer bus accesses the memory by transmitting blocks of computer words to store in the memory and by retrieving blocks of computer words from the memory;

providing a memory that can store or retrieve, during each clock cycle, a memory word having a size in bits at least equal to the sum of the sizes of the computer words of the number of computer buses, a port selector that alternately selects a port for each clock cycle, and read and write buffers associated with each of the number of computer buses; and during each clock cycle while the memory is concurrently accessed by the number of computer buses, for each of the number of computer buses, transferring a computer word between the computer bus and the read buffer or the write buffer associated with the computer bus; and transferring a memory word between the memory and the read buffer or the write buffer associated with the computer bus that is associated with the port currently selected by the port selector.

9. The method of claim 8 further comprising:

while receiving a block of computer words from a computer bus to store in the memory starting at a target computer bus address, translating the target computer bus address into a target memory address;

receiving a computer word from the port corresponding to the computer bus during each clock cycle and storing the computer word in the write buffer associated with the computer bus; and when the port selector has currently selected the port corresponding to the computer bus, combining a number of computer words stored in the write buffer associated with the computer bus to form a memory word, writing the memory word to the target memory address, and incrementing the target memory address.

10. The method of claim 8 further including:

while retrieving a block of computer words from the memory for transmission to a computer bus starting at a target computer bus address, translating the target computer bus address into a target memory address;

when the port selector has currently selected the port corresponding to the computer bus, retrieving a memory word from the target memory address, separating the memory word into a number of computer words, storing the number of computer words in the read buffer associated with the computer bus, and incrementing the target memory address; and selecting the next computer word from the read buffer associated with the computer bus and providing the selected computer word to the computer bus via the port corresponding to the computer bus.

11. The method of claim 8 wherein an independently and concurrently accessible memory is provided to two computer buses that can each transfer a 32-bit computer word during each clock cycle, wherein the memory can store or retrieve, during each clock cycle, a 64-bit memory word, and wherein each read and write buffer comprises 3 32-bit computer words.

12. The method of claim 11 wherein, by storing 3 32-bit computer words in the read and write buffers, the read and write buffers provide buffering of at least one subsequent computer word following, in sequence, the computer word that is being transferred via a port to or from a computer bus, so that, when the computer bus introduces a wait cycle during the transfer of a block of computer words and then, on a subsequent clock cycle, continues the transfer of a block of computer words, the buffered computer word is immediately available to continue the transfer without introducing an additional wait cycle and without retransfer of already transferred computer words.

13. In a high-performance dual-ported shared memory that provides independent storage and retrieval operations on blocks of computer words to two computer buses, controlled by a clock, without introducing wait states in either computer bus following initiation of a storage or retrieval operation, a method for buffering and transferring computer words between the computer buses and the memory, the method comprising:

providing a memory component for storing memory words having a size in bits equal to at least the size of two computer words and providing buffers associated with each computer bus;

during concurrent transfer of blocks of computer words between the memory component and the two computer buses, transferring a computer word between each computer bus and the buffers associated with each computer bus and transferring a memory word between one of the two buffers and the memory component during each clock cycle; and maintaining at least one subsequent computer word following, in sequence, the computer word that is being transferred to or from a computer bus, so that, when the computer bus introduces a wait cycle during the transfer of a block of computer words and then, on a subsequent clock cycle, continues the transfer of a block of computer words, the buffered subsequent computer word is immediately available to continue the transfer without introducing an additional wait cycle and without retransfer of already transferred computer words.

14. The method of claim 13 wherein, associated with each computer bus, are two buffers each comprising 3 computer words:

a read buffer including a head word, an even word, and an odd word; and a write buffer comprising a copy word, an even word, and an odd word.

15. The method of claim 14 further including:
  providing a selector that, on alternate clock cycles, selects a different computer bus; and
  transferring a memory word between one of the two buffers associated with the selected computer bus and the memory component during each clock cycle.

16. The method of claim 15 for transferring a block of computer words from a computer bus to a position in the memory component staring at the first computer word within a memory word when the first computer word is available on the computer bus during a clock cycle in which the computer bus is selected, the method further comprising:
  on the first clock cycle, transferring the first computer word of the block from the computer bus to the copy word of the write buffer; and
  on subsequent clock cycles, repeating:
    on the next clock cycle, copying the computer word in the copy word of the write buffer to the even word of the write buffer and transferring a computer word from the computer bus to the odd word of the write buffer; and
    on the next clock cycle, combining the computer words in the even word of the write buffer and the odd word of the write buffer to form a memory word and transferring the memory word to the memory component and transferring a computer word from the computer bus to the copy word of the write buffer.

17. The method of claim 15 for transferring a block of computer words from a computer bus to a position in the memory component starting at the first computer word within a memory word when the first computer word is available on the computer bus during a clock cycle in which the computer bus is not selected further comprising:
  on the first clock cycle, transferring the first computer word of the block from the computer bus to the copy word of the write buffer; and
  on subsequent clock cycles, repeating:
    on the next clock cycle, copying the computer word in the copy word of the write buffer to the even word of the write buffer, transferring a computer word from the computer bus to the odd word of the write buffer, combining the computer words in the even word of the write buffer and the odd word of the write buffer to form a memory word, and transferring the memory word to the memory component; and
    on the next clock cycle, transferring a computer word from the computer bus to the copy word of the write buffer.

18. The method of claim 15 for transferring a block of computer words from a computer bus to a position in the memory component starting at the second computer word within a memory word when the first computer word is available on the computer bus during a clock cycle in which the computer bus is selected further comprising:
  on the first clock cycle, transferring the first computer word of the block from the computer bus to the odd word of the write buffer;
  on the second clock cycle, transferring the second computer word of the block from the computer bus to the copy word of the write buffer;
  on the third clock cycle, transferring the first computer word of the block from the odd word of the write buffer to the second computer word within the starting memory word in the memory component, copying the second computer word from the copy word of the write buffer to the even word of the write buffer, and transferring the fourth computer word of the block from the computer bus to the odd word of the write buffer; and
  on subsequent clock cycles, repeating:
    on the next clock cycle, transferring a computer word from the computer bus to the copy word of the write buffer; and
    on the next clock cycle, combining the computer words in the even word of the write buffer and the odd word of the write buffer to form a memory word, and transferring the memory word to the memory component, copying the computer word in the copy word of the write buffer to the even word of the write buffer, and transferring a computer word from the computer bus to the odd word of the write buffer.

19. The method of claim 15 for transferring a block of computer words from a computer bus to a position in the memory component starting at the second computer word within a memory word when the first computer word is available on the computer bus during a clock cycle in which the computer bus is not selected further comprising:
  on the first clock cycle, transferring the first computer word of the block from the computer bus to the odd word of the write buffer;
  on the second clock cycle, transferring the second computer word of the block from the computer bus to the copy word of the write buffer and transferring the first computer word of the block from the odd word of the write buffer to the second computer word within the starting memory word in the memory component; and
  on subsequent clock cycles, repeating:
    on the next clock cycle, transferring a computer word from the computer bus to the odd word of the write buffer and copying the computer word in the copy word of the write buffer to the even word of the write buffer; and
    on the next clock cycle, combining the computer words in the even word of the write buffer and the odd word of the write buffer to form a memory word, transferring the memory word to the memory component, and transferring a computer word from the computer bus to the copy word of the write buffer.

20. The method of claim 15 for transferring a block of computer words from a position in the memory component starting at the first computer word within a memory word to a computer bus further comprising:
  repeating, starting with a next clock cycle during which the computer bus is selected:
    on the next clock cycle, retrieving a memory word from the memory component, separating the memory word into a first computer word and a second computer word, storing the first computer word in the head word of the read buffer and the even word of the read buffer, with the storing of the first computer word in the head word of the read buffer resulting in the transfer of the first computer word to the computer bus, and storing the second computer word in the odd word of the read buffer; and
    on the next clock cycle, copying the computer word in the odd word of the read buffer into the head word of the read buffer, with the copying of the computer word in the odd word of the read buffer into the head word of the read buffer resulting in the transfer of the computer word copied to the head word of the read buffer to the computer bus.

21. The method of claim 15 wherein the 3 computer words comprising the read buffers are designated the head word of the read buffer, the even word of the read buffer, and the odd word of the read buffer, the method for transferring a block of computer words from a position in the memory component starting at the second computer word within a memory word to a computer bus further comprising:

on the next clock cycle during which the computer bus is selected, retrieving a memory word from the memory component, separating the memory word into a first computer word and a second computer word, storing the first computer word in the even word of the read buffer and the second computer word in the odd word of the read buffer; and on subsequent clock cycles, repeating:

on the next clock cycle, copying the computer word in the odd word of the read buffer into the head word of the read buffer, with the copying of the computer word in the odd word of the read buffer into the head word of the read buffer resulting in the transfer of the computer word copied to the head word of the read buffer to the computer bus; and on the next clock cycle, retrieving a memory word from the memory component, separating the memory word into a first computer word and a second computer word, storing the first computer word in the even word of the read buffer and the head word of the read buffer and storing the second computer word in the odd word of the read buffer, with the storing of the first computer word in the head word of the read buffer resulting in the transfer of the first computer word to the computer bus.

\* \* \* \* \*